United States Patent
Ando et al.

(10) Patent No.: US 7,869,601 B2
(45) Date of Patent: Jan. 11, 2011

(54) AUTHENTICATION METHOD OF AD HOC NETWORK AND WIRELESS COMMUNICATION TERMINAL THEREOF

(75) Inventors: Eriko Ando, Kawasaki (JP); Shuichi Ishida, Yokohama (JP); Yasuko Fukuzawa, Yokohama (JP); Susumu Matsui, Machida (JP); Tetsuo Manchu, Toride (JP)

(73) Assignee: Hitachi, Ltd., Tokyo (JP)

( * ) Notice: Subject to any disclaimer, the term of this patent is extended or adjusted under 35 U.S.C. 154(b) by 1374 days.

(21) Appl. No.: 11/293,210

(22) Filed: Dec. 5, 2005

(65) Prior Publication Data

US 2006/0133613 A1 Jun. 22, 2006

(30) Foreign Application Priority Data

Dec. 7, 2004 (JP) ............................. 2004-354101

(51) Int. Cl.
 *H04K 1/00* (2006.01)
(52) U.S. Cl. .................... 380/270; 380/278; 713/169; 713/170; 713/171; 726/2
(58) Field of Classification Search ................ 380/270, 380/278; 713/169, 170, 171; 726/2
See application file for complete search history.

(56) References Cited

U.S. PATENT DOCUMENTS

| | | | | |
|---|---|---|---|---|
| 6,338,139 | B1 * | 1/2002 | Ando et al. | 713/168 |
| 7,233,664 | B2 * | 6/2007 | Soliman | 380/44 |
| 7,251,719 | B2 * | 7/2007 | Tabuchi et al. | 711/210 |
| 7,346,773 | B2 * | 3/2008 | Cam-Winget et al. | 713/155 |
| 7,350,076 | B1 * | 3/2008 | Young et al. | 713/169 |
| 7,395,429 | B2 * | 7/2008 | Kitani et al. | 713/171 |

(Continued)

FOREIGN PATENT DOCUMENTS

EP 1 102 431 A1 5/2001

(Continued)

OTHER PUBLICATIONS

Pirzada et al., Kerberos assisted authentication in Mobile Ad-Hoc Networks, Jan. 2004, ACSC '04 Proceedings of the 27th Australasian Conference on Computer Science -vol. 26, pp. 41-46.*

(Continued)

*Primary Examiner*—Kambiz Zand
*Assistant Examiner*—Tongoc Tran
(74) *Attorney, Agent, or Firm*—Antonelli, Terry, Stout & Kraus, LLP.

(57) ABSTRACT

On ad hoc networks in which connection relationships among communication terminals constantly change, the processing load increases when authentication is performed each time a connection relationship changes. According to this invention, when communication terminals possess the same common key, mutual authentication is conducted with that common key, and when communication terminals do not possess the same common key, mutual authentication is conducted with a public key. Communication terminals that conducted mutual authentication exchange and retain a common key that they selected and common keys received from other communication terminals. When neither communication terminal possesses a common key at authentication, one terminal creates a common key and distributes it to the other terminal, and when one terminal has a common key it creates that common key and distributes it to the other terminal. Further, a common key possessed by a communication terminal corresponding to a relay node is broadcast periodically.

9 Claims, 21 Drawing Sheets

U.S. PATENT DOCUMENTS

| | | | |
|---|---|---|---|
| 7,424,116 B2* | 9/2008 | Sowa et al. | 380/247 |
| 2002/0002678 A1* | 1/2002 | Chow et al. | 713/169 |
| 2002/0004875 A1* | 1/2002 | Chu | 711/1 |
| 2002/0037736 A1 | 3/2002 | Kawaguchi et al. | |
| 2002/0078352 A1* | 6/2002 | Angwin et al. | 713/169 |
| 2002/0114469 A1* | 8/2002 | Faccin et al. | 380/270 |
| 2003/0105812 A1* | 6/2003 | Flowers et al. | 709/203 |
| 2005/0152305 A1* | 7/2005 | Ji et al. | 370/328 |
| 2007/0198830 A1* | 8/2007 | Imai | 713/156 |

FOREIGN PATENT DOCUMENTS

| | | |
|---|---|---|
| JP | 10-004586 | 1/1998 |
| JP | 10-112883 | 4/1998 |
| JP | 2002-111679 | 4/2002 |
| JP | 2002-300152 | 10/2002 |

OTHER PUBLICATIONS

Kim et al., "Secure Mutual Authentication for Ad hoc Wireless Networks", Jul. 2005, The Journal of Supercomputing, col. 33, Issue 1, pp. 123-132.*

* cited by examiner

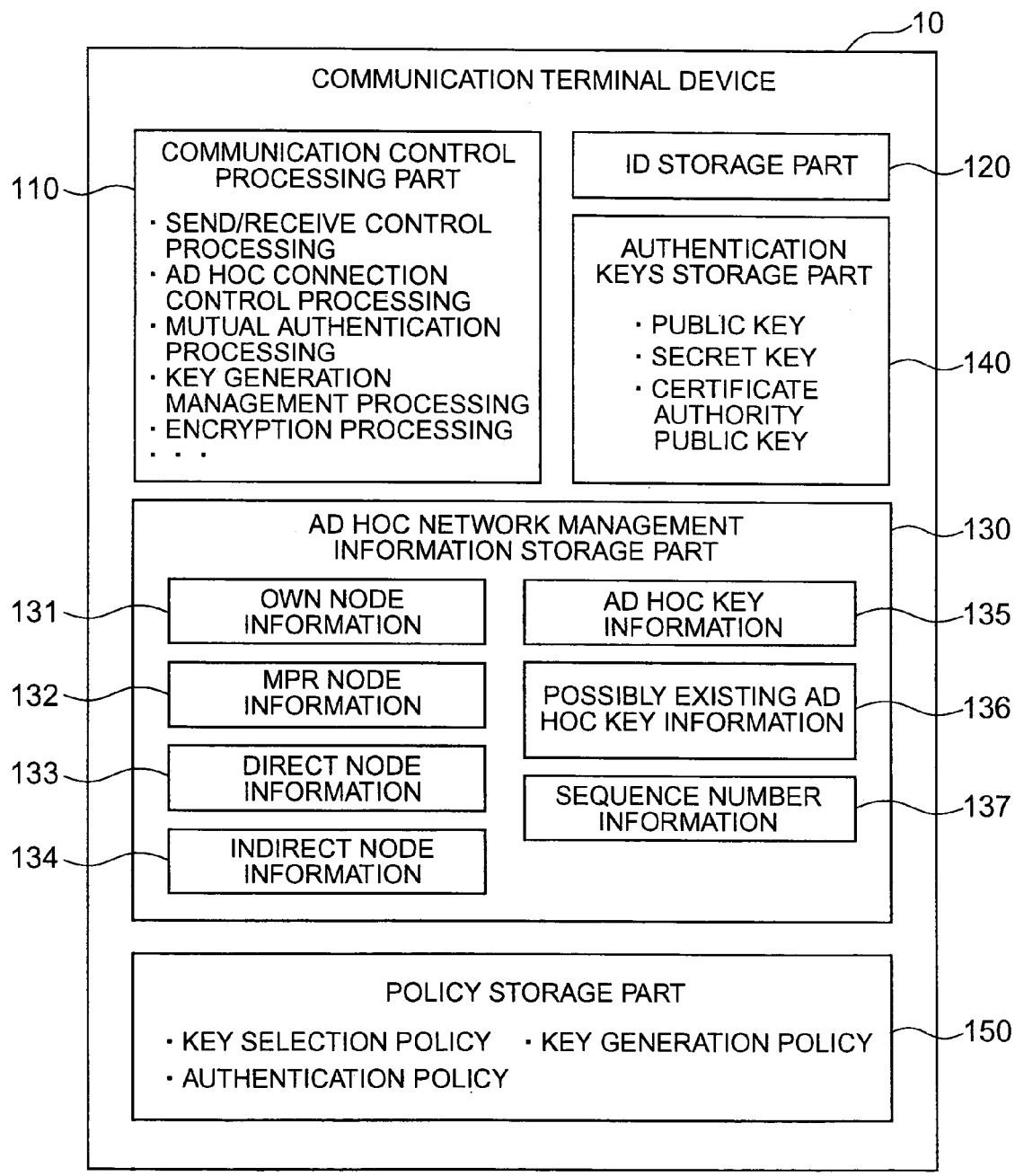

HELLO MESSAGE 400

TC MESSAGE 410

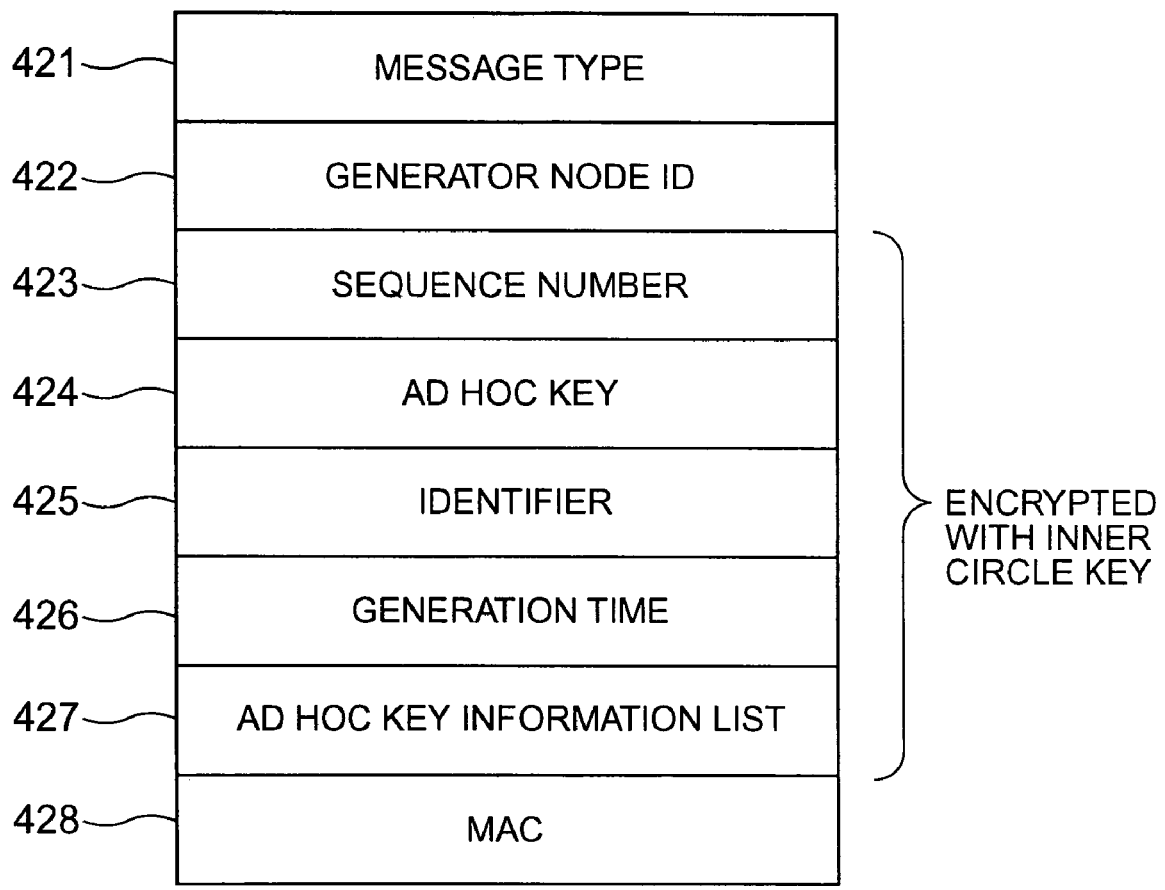

FIG. 6A
OWN NODE INFORMATION 131
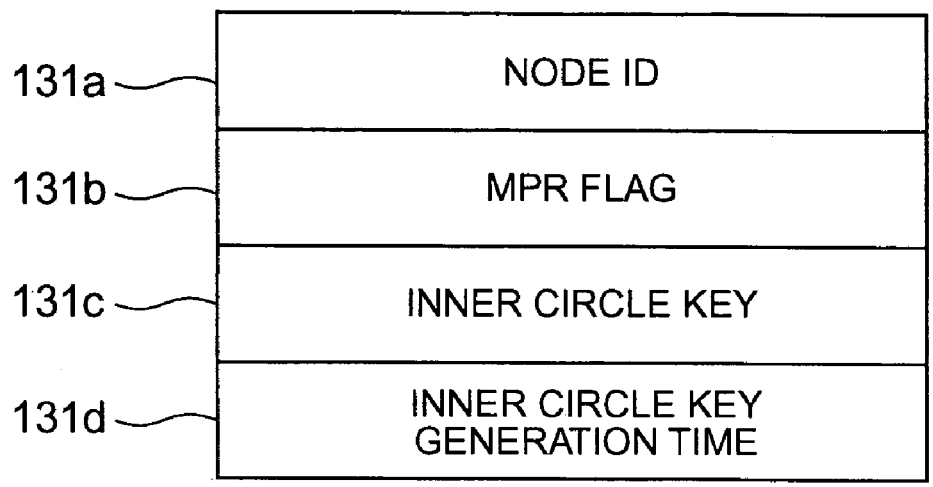
- 131a — NODE ID
- 131b — MPR FLAG
- 131c — INNER CIRCLE KEY
- 131d — INNER CIRCLE KEY GENERATION TIME
FIG. 6B
MPR NODE INFORMATION 132
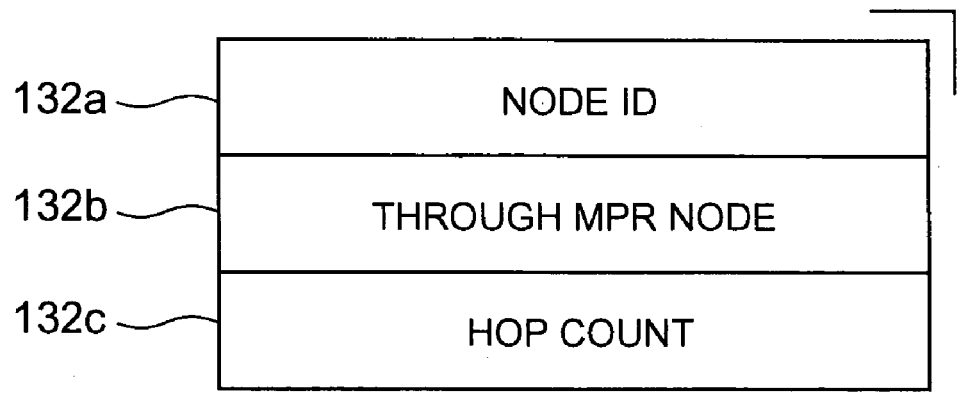
- 132a — NODE ID
- 132b — THROUGH MPR NODE
- 132c — HOP COUNT
 INDICATES PLURALITY THEREOF MAY EXIST

DIRECT NODE INFORMATION 133

- 133a — NODE ID
- 133b — MPR IDENTIFICATION FLAG
- 133c — CERTIFICATION INFORMATION
- 133d — INNER CIRCLE KEY
- 133e — INTER-NODE KEY

INDIRECT NODE INFORMATION 134

- 134a — NODE ID
- 134b — THROUGH MPR NODE
- 134c — HOP COUNT
- 134d — CERTIFICATION INFORMATION

AD HOC KEY INFORMATION 135

POSSIBLY EXISTING AD HOC KEY INFORMATION 136

SEQUENCE NUMBER INFORMATION 137

AUTHENTICATION REQUEST MESSAGE 1400

AUTHENTICATION RESPONSE MESSAGE 1410

AUTHENTICATION MESSAGE 1500

KEY EXCHANGE MESSAGE 1510

AUTHENTICATION METHOD OF AD HOC NETWORK AND WIRELESS COMMUNICATION TERMINAL THEREOF

BACKGROUND OF THE INVENTION

The present invention relates to an authentication method of an ad hoc network and a wireless communication terminal thereof, and more particularly to an ad hoc network authentication method that is suitable for an ad hoc network in which connection relationships are fluid and that reduces the processing load of wireless communication terminals by efficiently performing processing for mutual authentication between wireless communication terminals, and a wireless communication terminal thereof.

An ad hoc network is a network in which wireless communication terminals (personal computers, PDAs, mobile telephones and the like) do not require access points that intervene in communication between the terminals and in which the terminals can connect autonomously with each other. Therefore an ad hoc network does not require a base station or access points and makes it possible to configure a network at a low cost in a location without such infrastructure, and is thus effective as means for configuring a simple network in a limited area.

Thus, without depending on existing specific network infrastructure such as a telephone line, a mobile phone network or an internetwork, an ad hoc network enables the participating communication terminals to behave in an autonomous and decentralized manner on an equal basis with each other and allows communication terminal devices (nodes) within the transmission range to exchange information with each other directly by wireless communication. It is also possible for nodes that the radio waves do not reach and which consequently cannot exchange information directly with other nodes to exchange information through a node that is partway along the communication route relaying the information (multihop wireless communication).

In this kind of ad hoc network, when configuring a closed communication network that enables communication only among communication terminal devices belonging to a particular group, in order to ensure the security of information within the group it is necessary to prevent connections by communication terminal devices that do not belong to the group and also prevent leakage of communication data. It is also necessary to perform communication securely and smoothly even when nodes move and the connection relationships between nodes change.

Regarding security in a closed communication network, for example JP-A-2002-111679 discloses technology for ensuring security in a group communication system configuring a closed communication network autonomously with many and unspecified communication terminals by distributing a common key for encryption or the like. More specifically, JP-A-2002-111679 proposes a method in which a communication terminal device that is the source of a calling message establishes a p-to-p (peer-to-peer) connection with a communication terminal device that responds to the message, and in which a common key can be shared within a group by distributing the common key with a public key of the communication terminal device on the responding side.

Further, EP-1102430A1 discloses technology whereby, when an arbitrary communication terminal device wants to join an ad hoc network, the terminal is authenticated by a node with which it is not directly connected.

Furthermore, JP-A-2002-300152 discloses an authentication method used in a case where a plurality of base stations and mobile communication terminals are present and a connection changed to another base station from a base station that had a connection with a particular mobile communication terminal device. More specifically, an authentication consecutive key is generated at a particular base station using a key that is shared by base stations and distributed to the communication terminal device. When the communication terminal device connects with another base station, the communication terminal device performs authentication with the other base station using the authentication consecutive key that it received.

SUMMARY OF THE INVENTION

The technology disclosed in the above described JP-A-2002-111679 is based on the premise that communication terminal devices constituting a closed communication network have established a p-to-p connection with each other. Therefore, in an ad hoc network that uses multihop communication a problem exists that this technology can not be applied as it is, particularly with respect to distributing a common key in order to share the common key.

Further, the above described EP-1102430A1 also does not consideration to the efficiency of authentication processing in a case in which a connection relationship changed or to the distribution of a common key.

Furthermore, the technology disclosed in the above described JP-A-2002-300152 is a server and client type model, and there is thus a problem that the technology can not be applied as it is to an ad hoc network in which a server does not exist.

In this connection, in ad hoc networks a system exists that uses a public key for two-way authentication. In authentication using this public key, a terminal seeking authentication sends data such as a random number. When an authenticating terminal receives this data it encrypts the data using a secret key and returns this data to the terminal seeking authentication. The encrypted data is then decrypted by the terminal seeking authentication using a public key, and when the resulting data matches the data that was originally sent it confirms that the terminal seeking authentication possesses the secret key and that terminal is thus authenticated as an authentic communication party. This type of authentication using a public key has an advantage that management of a key used in encryption is simple.

In contrast, a so-called secret key cryptography system also exists in which both terminals perform authentication using a common cryptographic key. However, since all the terminals on an ad hoc network use the same cryptographic key, there is a security problem that if one key is stolen then the cryptographic keys of all the terminals on the network can no longer be used.

In a public key system, since different cryptographic keys are used by each terminal the system is excellent from a security viewpoint but has a disadvantage that the processing load for authentication is increased. This is a major problem for ad hoc networks, in which the positional relationships of terminals are fluid and authentication processing often occurs.

This invention was made in order to solve the above described problems, and an object of this invention is to provide an authentication method for an ad hoc network that allows authentication processing between terminals to be performed efficiently while maintaining the security thereof.

This invention is directed at improving the efficiency of authentication processing in a case where communication terminal devices moved and the connection relationships of the network changed and also where a terminal whose connection was temporarily disconnected rejoins the ad hoc network, by performing authentication using keys that are shared among all the communication terminal devices that configure the ad hoc network.

More specifically, when a communication terminal device wants to join an ad hoc network, authentication is carried out with an adjacent communication terminal device. When the terminals do not possess a common key, mutual authentication is performed using a public key. When the terminals possess a common key, mutual authentication is performed with the common key.

When the authentication is successful, a common key is shared between the communication terminal devices.

In a case where a communication terminal device moves and the connection relationship changed or when a communication terminal device was temporarily disconnected and then reconnected, authentication is performed using a common key when that key has been shared.

A key that is shared among communication terminal devices configuring the ad hoc network is periodically distributed by each communication terminal device that is a relay node of the ad hoc network routing.

There is a possibility that a common key may be generated between separate terminals and used. For this reason, in general a plurality of common keys exists among the communication terminal devices of the ad hoc network. Thus, a communication terminal device may, in addition to a common key that the terminal itself used for authentication with another terminal, distribute a common key received from another communication terminal device to a different communication terminal device as common key information. A wireless communication terminal that received the common key information may edit this common key information in accordance with certain criteria (for example, discard keys with an older generation time and retain the new key) and then distribute the common key information to another communication terminal device.

According to this invention, there can be provided an authentication method of an ad hoc network that enables mutual authentication processing to be performed efficiently between terminals while maintaining the security thereof.

BRIEF DESCRIPTION OF THE DRAWINGS

FIG. 3 is a block diagram showing an example of the functional configuration of the communication terminal device 10;

FIG. 5 is a view showing an example of an ad hoc key information message 420;

FIGS. 6A and 6B are views showing an example of own node information 131 and MPR node information 132;

EMBODIMENTS OF THE INVENTION

Hereunder, the embodiments of this invention are described using FIGS. 1 to 21.

[Outline of Communication According to Ad Hoc Network of this Invention]

First, an outline and the basic concept of communication according to the ad hoc network of this invention will be described using FIG. 1.

Figure 1:
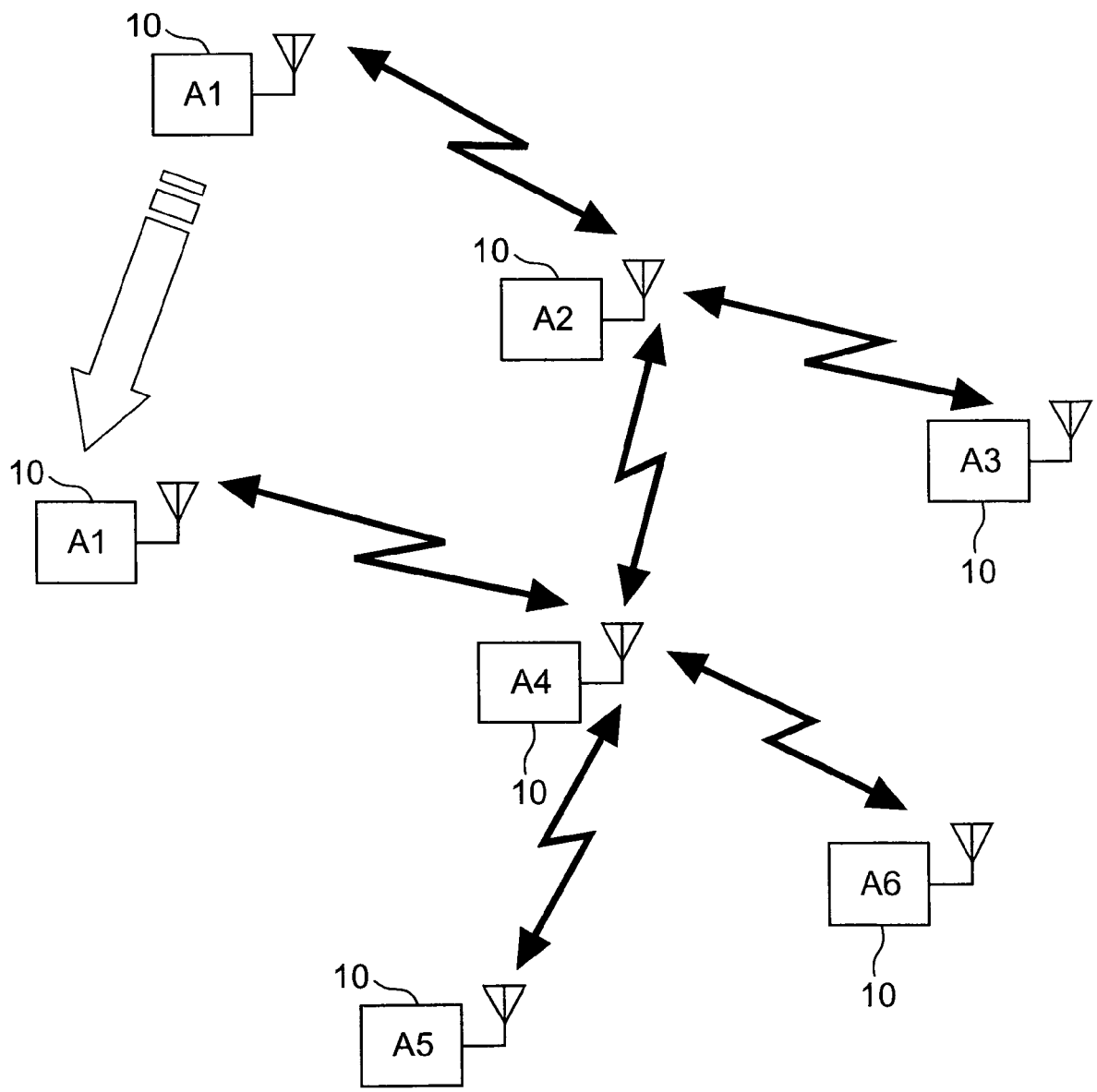
FIG. 1 is a view used to illustrate a general overview of communication according to an ad hoc network.

FIG. 1 is a view used to illustrate an overview of communication according to the ad hoc network of this invention.

As shown in the figure, a case is considered in which, among many unspecified communication terminal devices 10 (nodes), communication terminal devices 10 (A1 to A6) belonging to a specific group configure an ad hoc network as a temporary closed communication network by autonomous and decentralized wireless communication.

More specifically, the communication terminal device 10 (A2) is in a connection state with communication terminal devices 10 (A1, A3, A4), and the communication terminal device 10 (A4) is in a connection state with communication terminal devices 10 (A2, A5, A6). It is assumed that, as described later, these communication terminal devices are in a connection state in which the communication terminal devices 10 belonging to the group are included in the respective radio transmission ranges thereof. In this state, it is possible for the communication terminal devices 10 (A1 to A6) to conduct reciprocal communication within the group. For example, although the communication terminal device 10 (A1) is not in a connection state with the communication terminal device 10 (A4), the communication terminal device 10 (A1) can communicate with the communication terminal device 10 (A4) by relaying the communication through the communication terminal device 10 (A2).

This invention relates to the simplification of authentication processing in a case in which, when a group is configured by the communication terminal devices 10 of an ad hoc network in this manner, the respective communication terminal devices 10 move and the connection relationships change or in which a communication terminal device 10 within the group temporarily leaves the group and then rejoins.

For example, in a case where the communication terminal device 10 (A1) that is in a connection state with the communication terminal device 10 (A2) moves and newly connects with the communication terminal device 10 (A4), the authentication processing with the communication terminal device 10 (A4) can be simply performed and a smooth connection can be made. Further, in a case where the communication terminal device 10 (A5) leaves the group and is temporarily unable to communicate with the communication terminal device 10 (A4), and thereafter the communication terminal device 10 (A5) connects with the communication terminal device 10 (A4) again, the authentication processing can be simply performed and a smooth connection can be made.

According to this invention, to enable a smooth connection for authentication when a communication terminal device 10 moved or temporarily left the group, a common key is used that is shared by all the communication terminal devices 10 that are connected to the ad hoc network. In some cases only one common key is used within the ad hoc network while in other cases a plurality of keys are used. In this specification, a common key that is used commonly by the group of this ad hoc network is referred to as an "ad hoc key".

As described later, when neither of the communication terminal devices 10 possesses an ad hoc key at the time of key exchange after mutual authentication, an ad hoc key is generated by one of the communication terminal devices 10 and then distributed by a relay node to all the communication terminal devices 10 that are adjacent to the relay node. As a result, there is a possibility that a plurality of ad hoc keys will exist within the ad hoc network. Consequently, each ad hoc key is attached with an identifier that is unique within the system and each communication terminal device 10 is configured such that it can perform management of ad hoc keys.

In this connection, in addition to an ad hoc key, each communication terminal device 10 manages an inter-node key and an inner circle key, and performs encryption of communication with another communication terminal device 10 or within a range in which transmission is possible (referred to as "inner circle") of the communication terminal device 10. In particular, the inner circle key is also used when distributing the ad hoc key.

In this case, for example, an inner circle key of the communication terminal device 10 (A2) is generated by the communication terminal device 10 (A2) and distributed to the communication terminal devices 10 that completed mutual authentication with the communication terminal device 10 (A2), that is, in the example of FIG. 1, the communication terminal devices 10 (A1, A3, A4). The key is thus shared by the communication terminal devices 10 (A1 to A4). Accordingly, in the example of FIG. 1, a total of six inner circle keys exist, representing the inner circle keys of A1 to A6.

An inter-node key is a key that is shared by communication terminal devices 10 that performed mutual authentication. Accordingly, in the example of FIG. 1, a total of six inter-node keys exist that consist of the inter-node keys for A1-A2, A2-A3, A2-A4, A4-A5 and A4-A6.

In this connection, an inter-node key, inner circle key and ad hoc key can each include not only a cryptographic key that encrypts communication data, but also a plurality of keys for other purposes such as an integrity guarantee key that guarantees the integrity of data.

[Routing System of ad Hoc Network]

Next, a general outline of a routing system in an ad hoc network that is assumed in order to describe this invention is explained using FIG. 4.

FIG. 4 is a view showing an example of the format of a hello message and a Tc message.

The standardization of routing systems of ad hoc networks is being examined by IETF MANet (Mobile Ad Hoc Networking), and one of the proposed systems, OLSR (Optimized Link State Routing), is described here as an example. The OLSR system is a so-called proactive type routing system. A detailed description of the OLSR system is available on the Internet at http://www.ietf.org/rfc/rfc3626.txt.

However, this invention is not limited to this system and the invention can also be applied to other proactive type or reactive type or hybrid type routing systems and the like.

In the OLSR system, each communication terminal device 10 autonomously broadcasts a hello message as a control message, for example, every two seconds. Here, it is assumed that the hello message includes an originator identifier, a list of adjacent nodes to which direct (one hop) communication is possible, and an MPR node list that is a list of MPR nodes that will be described next. This hello message is received by other communication terminal devices 10 that are present within the transmission range. In this connection, mutual authentication is not addressed here.

Another communication terminal device 10 that received the hello message refers to the hello message and when a node exists to which the communication terminal device 10 itself cannot perform direct communication but to which it can communicate indirectly by having the source node of the hello message transfer the communication, the communication terminal device 10 in question identifies the source node as an MPR (Multi Point Relays) node. It then adds the node identified as an MPR node to the MPR node list of a hello message to be transmitted next and transmits the message.

For example, in FIG. 1, although the communication terminal device 10 (A1) cannot perform communication directly with the communication terminal device 10 (A3), it can perform indirect communication with the communication terminal device 10 (A3) through the communication terminal device 10 (A2). In this case, the communication terminal device 10 (A1) identifies that the communication terminal device 10 (A2) is an MPR node for itself by means of a hello message from the communication terminal device 10 (A2), and an identifier, for example, an IP address, of the communication terminal device 10 (A2) is then included in the MPR node list of a hello message transmitted from the communication terminal device 10 (A1).

Figure 4A:
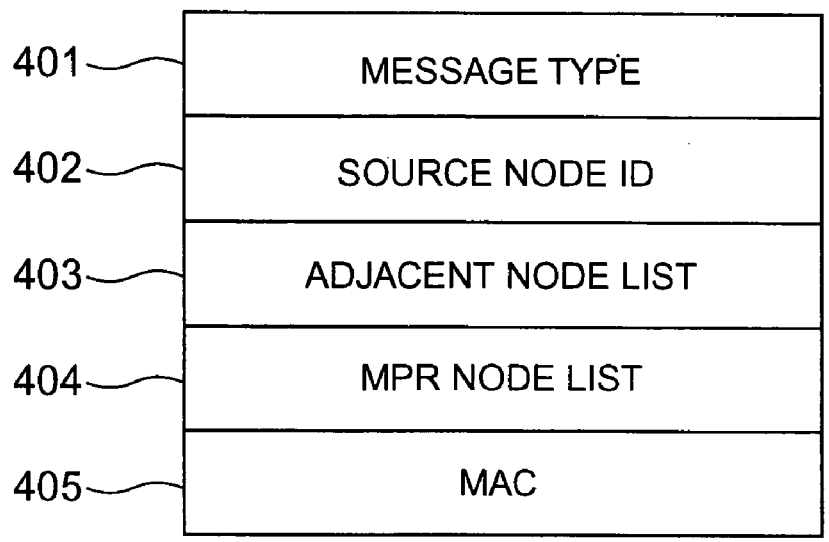
FIGS. 4A and 4B are views showing an example of the format of a hello message and a Tc message.

FIG. 4A is a view showing one example of the format of a hello message.

As shown in FIG. 4A, a hello message 400 is composed of a message type 401, a source node ID 402, an adjacent node list 403, an MPR node list 404 and a MAC (Message Authentication Code) 405.

The message type 401 is an identifier showing that this message is a hello message. The source node ID 402 is an identifier for identifying the communication terminal device 10 as the message source. The adjacent node list 403 is a list of adjacent nodes that are at a distance of one hop from the source of this message. The MPR node list 404 is a list of nodes corresponding to MPR nodes from the viewpoint of the source of this message. The MAC (Message Authentication Code) 405 is a code that ensures the integrity of the message contents.

As the source node ID 402, for example, an IP address can be used. Further, in the one-hop adjacent node list 403 and the MPR node list 404, each node included in the list can be identified by use of an IP address.

In this connection, if we assume that in the example of FIG. 1 the communication terminal device 10 (A1) is the source of the hello message 400, the identifier of the communication terminal device 10 (A2) will be entered in both the adjacent node list 403 and the MPR node list 404.

The MAC 405, for example, encodes and stores the message contents using an inner circle key, and it is thus possible to prevent manipulation of the message or the like.

In addition to a hello message, a communication terminal device 10 that is an MPR autonomously broadcasts a Tc (Topology Control) message, for example, every five seconds. It is assumed here that the Tc message includes a list of nodes that recognize the generator of the Tc message as an MPR node. In this connection, the own communication terminal device 10 can determine whether or not it is an MPR by referring to a hello message that was sent from another communication terminal device 10.

An MPR node that received the Tc message transfers the Tc message to adjacent nodes. At this time, the MPR node adds its own identifier, for example, its IP address, to the MPR node list before transferring the message.

Each communication terminal device 10 that received the Tc message generates or updates a routing table on the basis of the Tc message. It is thus possible for each communication terminal device 10 to ascertain the topology of the ad hoc network and to control the delivery of communication data within the ad hoc network in accordance with the routing table.

Figure 4B:
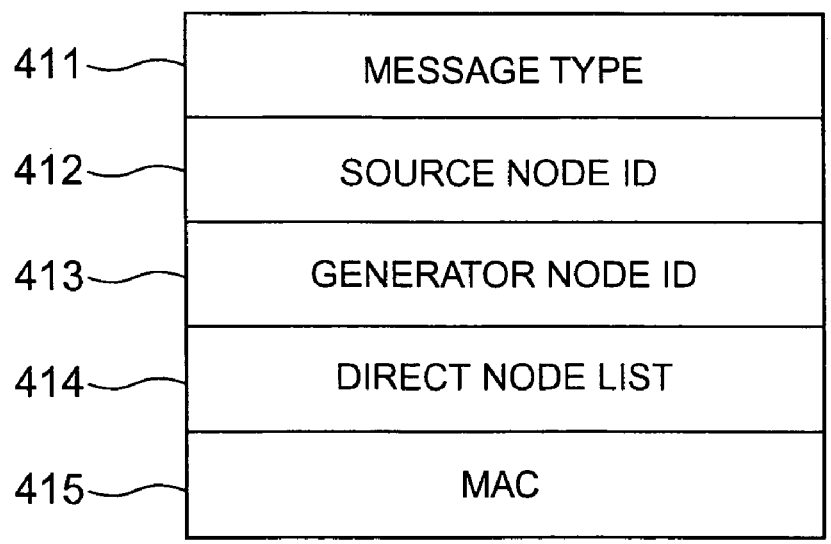

FIG. 4B is a view showing an example of the format of a Tc message.

As shown in FIG. 4B, a Tc message 410 is composed by a message type 411, a source node ID 412, a generator node ID 413, a direct node list 414 and a MAC 415.

The message type 411 is an identifier showing that this message is a Tc message. The source node ID 412 is an identifier showing the node that is the source of the Tc message. The generator node ID 413 is an identifier showing the node that is the generator of the Tc message. The direct node list 414 is a list of direct nodes with respect to the node that is the generator of the Tc message. The MAC 415 is a code for ensuring the integrity of the message contents.

In this case, the term "direct node" refers to a node that recognizes the generator of the Tc message as an MPR node. In the example of FIG. 1, when the communication terminal device 10 (A2) is the generator of a Tc message, the identifiers of the communication terminal device 10 (A1) and communication terminal device 10 (A3) are entered in the direct node list 414.

A communication terminal device 10 that is an MPR can manage the contents of the topology of the ad hoc network from the received message to create a Tc message.

[Ad Hoc Key Information Message 420]

Next, an ad hoc key information message 420 will be described using FIG. 5.

FIG. 5 is a view showing an example of the ad hoc key information message 420.

The ad hoc key information message 420 is a message that conveys to another node information relating to an ad hoc key that is known by the source node. As shown in FIG. 5, the ad hoc key information message 420 is composed of a message type 421, a source node ID 422, a sequence number 423, an ad hoc key 424, an identifier 425, a generation time 426, an ad hoc key information list 427 and a MAC 428.

The message type 421 is an identifier showing that this message is an ad hoc key information message. The source node ID 422 is an identifier showing the node that is the source of the ad hoc key information message. The sequence number 423 is a serial number that identifies the ad hoc key information message. The ad hoc key 424 is an ad hoc key that is currently selected by the own node. The identifier 425 is an identifier of the ad hoc key 424. The generation time 426 is the time the ad hoc key 424 was generated. The ad hoc key information list 427 is a list of past ad hoc keys of the own node or of ad hoc keys received from adjacent nodes. The MAC 428 is a code for ensuring the integrity of the message contents.

The sequence number 423, the ad hoc key 424, the identifier 425, the generation time 426 and the ad hoc key information list 427 are encrypted with an inner circle key to enhance security.

The ad hoc key information message 420 is thus a message that records information relating to ad hoc keys that the own node can know. The times when this ad hoc key information can be sent and received by the communication terminal devices 10 are, as described later, when the information is sent from an MPR node together with a Tc message and when performing key exchange after completing mutual authentication.

The ad hoc key information message 420 enables each communication terminal device 10 within the ad hoc network to ascertain the network topology and, at the same time, to acquire an ad hoc key.

[Configuration of Communication Terminal Device]

Figure 2:
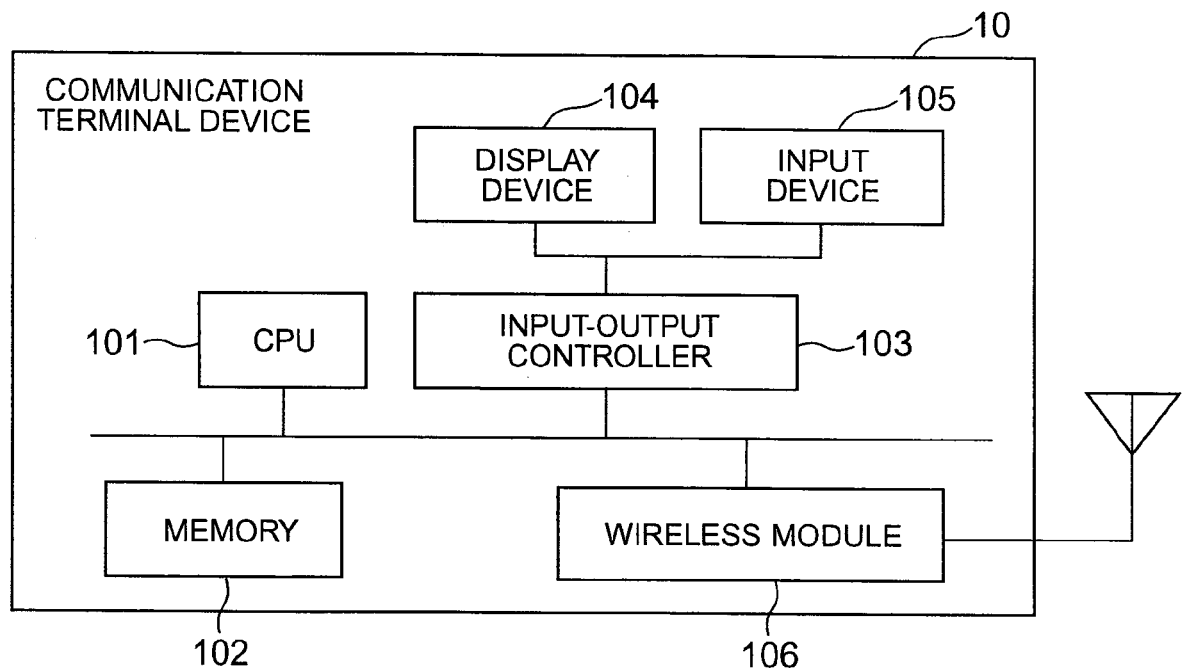
FIG. 2 is a block diagram showing an example of the hardware configuration of a communication terminal device 10.

Next, the configuration of the communication terminal device 10 used in the ad hoc network of this invention is described using FIG. 2 and FIG. 3.

FIG. 2 is a block diagram showing one example of the hardware configuration of the communication terminal device 10 of this invention.

FIG. 3 is a block diagram showing one example of the functional configuration of the communication terminal device 10 of this invention.

As shown in FIG. 2, the communication terminal device 10 comprises a CPU 101, a memory 102, an input-output controller 103, a display device 104 such as a liquid crystal display, an input device 105 such as a pointing device or a button key, and a wireless module 106. Typical examples of a communication terminal device having this type of configuration include a personal computer, a portable information processing device such as a PDA, and a mobile phone. Naturally, the hardware configuration of the communication terminal device 10 is not limited to this configuration.

The wireless module 106 performs wireless communication that corresponds to the specifications of a predetermined wireless LAN such as, for example, Bluetooth (registered trademark). In this connection, the standardization of wireless LAN specifications is being carried out through IEEE 802.11:ANSI/IEEE Std 802.11 1999 Edition (http://www.ieee.org) and the like, and specifications for Bluetooth are disclosed in "Specifications of the Bluetooth System, Version 1.0B" (http://www.bluetooth.com). However, the wireless module 106 may be a module that performs communication by other wireless specifications, for example, wireless specifications using a mobile phone network.

The communication terminal device 10 has the functional parts shown in FIG. 3. These functions are realized by the CPU 101 performing processing in accordance with a program code and data and the like recorded in the memory 102. Although a program executed by the communication terminal device 10 is stored in the memory 102, the program may be loaded from a memory card such as an SD card or may be downloaded by wireless transmission from a server.

As shown in FIG. 3, the communication terminal device 10 consists of a communication control processing part 110, an ID storage part 120, an ad hoc network management information storage part 130, an authentication keys storage part 140 and a policy storage part 150.

The communication control processing part 110 performs sending and receiving control processing, ad hoc connection control processing, mutual authentication processing, key generation management processing and encryption processing and the like.

The ID storage part 120 stores identification information for identifying the communication terminal device 10. As the identification information, for example, an IP address, MAC (Media Access Control) address or the like can be used.

The ad hoc network management information storage part 130 stores information necessary for configuring an ad hoc network.

The authentication keys storage part 140 stores keys of a public key encryption system including a public key, a secret key and a certificate authority's public key that are used when communication terminal devices 10 perform mutual authentication processing.

The policy storage part 150 records policies to which the communication control processing part 110 refers that relate to sending and receiving control processing, ad hoc connection control processing, mutual authentication processing, key generation management processing, encryption processing and the like.

The ad hoc network management information storage part 130 records own node information 131, MPR node information 132, direct node information 133, indirect node information 134, ad hoc key information 135, ad hoc key history information 136, possibly existing ad hoc key information 137 and sequence number information 138.

[Detailed Description of Information of Ad Hoc Network Management Information Storage Part 130]

Next, the information retained in the ad hoc network management information storage part 130 is described in detail using FIG. 6.

FIG. 6 is a view showing one example of the own node information 131 and the MPR node information 132.

FIG. 7 is a view showing one example of direct node information 133 and indirect node information 134.

FIG. 8 is a view showing one example of information relating to an ad hoc key.

The own node information 131 is information relating to the communication terminal device 10 itself, and as shown in FIG. 6A, it consists of a node ID 131a, an MPR flag 131b, an inner circle key 131c and an inner circle key generation time 131d.

The node ID 131a is an identifier of the communication terminal device 10, and for example an IP address can be used as the identifier. The MPR flag 131b is a flag which indicates whether or not the communication terminal device 10 is itself an MPR node. The inner circle key 131c is an inner circle key generated by the communication terminal device 10 itself. The inner circle key generation time 131d is the time at which the inner circle key was generated.

In this connection, the own node information 131 may include information other than this, for example, status information showing the status of the own node.

The MPR node information 132 manages information relating to MPR nodes that are present within the ad hoc network in the form of a list of MPR node units, and as shown in FIG. 6B it consists of a node ID 132a, a through MPR node 132b and a hop count 132c.

As described above, an MPR node is a node that is the generator of a Tc message.

The node ID 132a is an identifier of the MPR node, and for example an IP address can be used as the identifier. The through MPR node 132b is an identifier of the MPR node to request to transfer data when sending data to that MPR node. The hop count 132c stores the number of hops from the own communication terminal device 10 to that MPR node.

The MPR node information 132 may include information other than this, for example, status information showing the status of the MPR node.

Figure 7A:
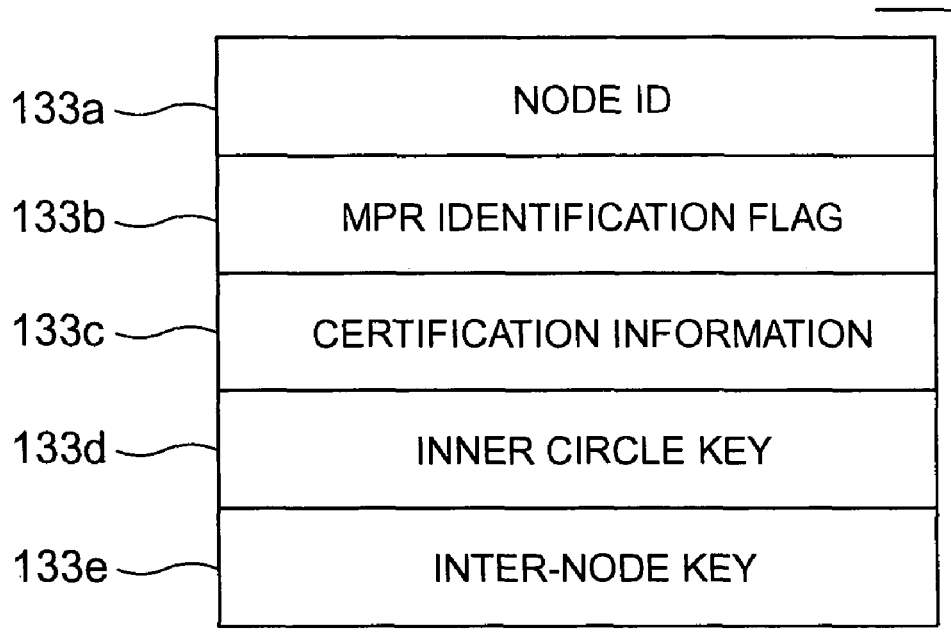
FIGS. 7A and 7B are views showing an example of direct node information 133 and indirect node information 134.

The direct node information 133 manages adjacent nodes with which the own node can perform communication directly with one hop as direct nodes in the form of a list of node units. As shown in FIG. 7A, the direct node information 133 consists of a node ID 133a, an MPR identification flag 133b, certification information 133c, an inner circle key 133d and an inter-node key 133e.

The node ID 133a is an identifier of an adjacent node, and for example an IP address can be used as the identifier. The MPR identification flag 133b is a flag showing whether or not the adjacent node considers the own communication terminal device 10 as an MPR node. The certification information 133c is information relating to mutual authentication with the adjacent node. The inner circle key 133d is the circle key of the adjacent node, and the inter-node key 133d is an inter-node key that is a key shared with the adjacent node. This inter-node key is generated at the time of mutual authentication with the adjacent node.

The direct node information 133 may include information other than this, for example, status information showing the inter-node status.

Figure 7B:
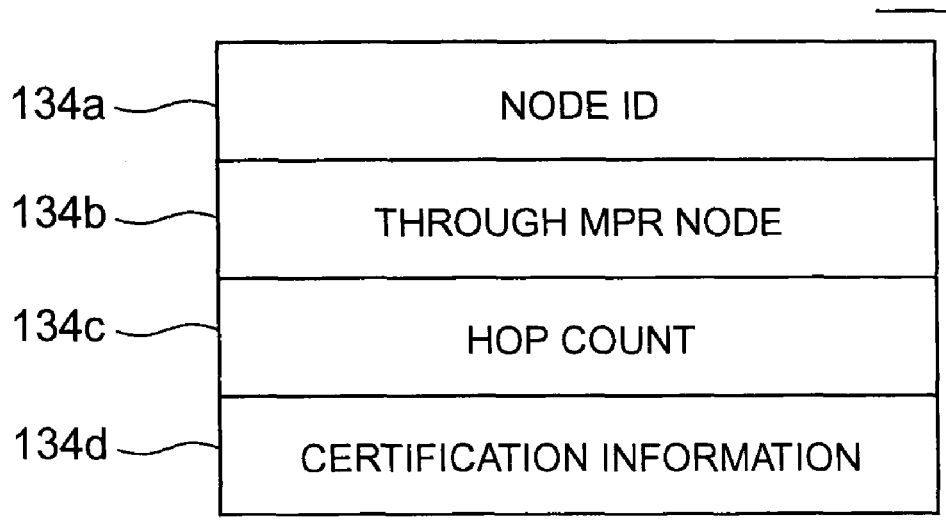

The indirect node information 134 manages information relating to indirect nodes with which the own node can perform communication indirectly in the form of a list of node units. As shown in FIG. 7B, it consists of a node ID 134a, a through MPR node 134b, a hop count 134c and certification information 134d.

As described in the foregoing, the node of each communication terminal device 10 performs communication with an indirect node through an MPR node.

The node ID 134a is an identifier of an indirect node, and for example an IP address can be used as the identifier. The through MPR node 134b is an identifier of an MPR node to request to transfer a message when sending data to the indirect node in question. A through MPR node is a direct node when considered from the viewpoint of that node. In this connection, a plurality of through MPR nodes may exist. The hop count 134c stores the number of hops from the own communication terminal device 10 to the indirect node. The certification information 134d is certification data such as a MAC that is included in a Tc message sent by the communication terminal device 10 that is an MPR node with respect to the indirect node. Thus, the correctness of the indirect node is indirectly ensured.

The indirect node information 134 may include information other than this, for example, status information showing the status of the indirect node.

Figure 8A:
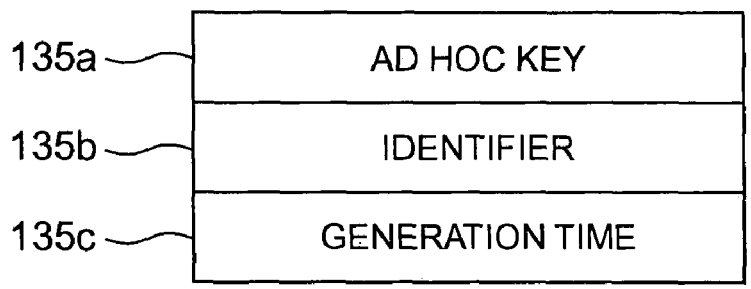
FIGS. 8A-8C are views showing an example of information relating to an ad hoc key.

The ad hoc key information 135 is information relating to an ad hoc key, and as shown in FIG. 8A, it consists of an ad hoc key 135a, an identifier 135b and a generation time 135c.

The ad hoc key 135a is a key that was selected by the own node as the most recent ad hoc key. The identifier 135b is the identifier of the ad hoc key 135a, and the generation time 135c is the time at which the ad hoc key 135a was generated. The identifier 135b, for example, can include a part or all of information such as the node ID and generation time, and can be set on the basis of identification rules that can be uniquely determined by the entire ad hoc network.

Figure 8B:
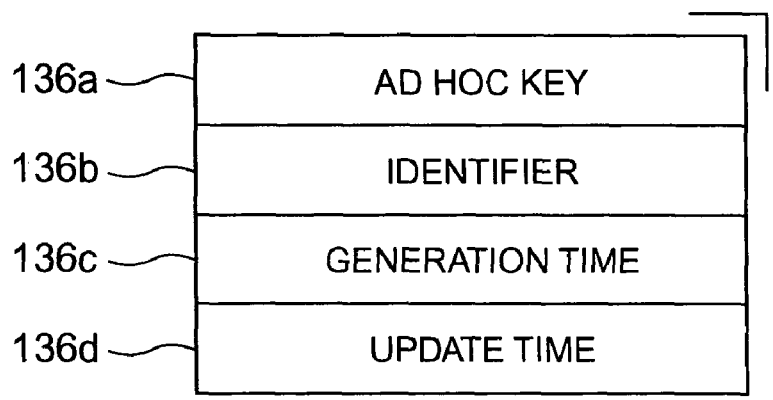

The possibly existing ad hoc key information 136 manages information relating to ad hoc keys that were received from adjacent nodes or ad hoc keys that were selected by the own node in the past, and as shown in FIG. 8B, the information consists of an ad hoc key 136a, an identifier 136b, a generation time 136c and an update time 136d.

The ad hoc key 136a is an ad hoc key that was received from an adjacent node or an ad hoc key that was selected by the own node in the past. The identifier 136b is the identifier of the ad hoc key 136a, and the generation time 136c is the time at which the ad hoc key 136a was generated. The update time 136d is the time at which the ad hoc key 136a was registered.

In this connection, although there is only one of the ad hoc key information 135, in some cases there may be a plurality of the possibly existing ad hoc key information 136. The update time 136d is updated at the first time the ad hoc key is received from another node, and is not updated when the ad hoc key is received a second or subsequent time. This is to prevent an ad hoc key that was generated at an old time from remaining on the network indefinitely.

Figure 8C:
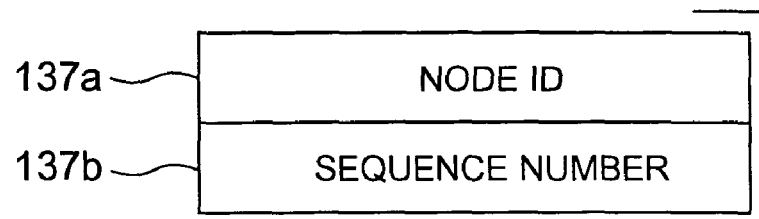

The sequence number information 137 manages sequence numbers of the ad hoc key information message 420 in the form of a list of node units and, as shown in FIG. 8C, it consists of a node ID 137a and a sequence number 137b.

The node ID 137a is an identifier of the communication terminal device 10 that sent the ad hoc key information message 420 and the sequence number 137b is the sequence number of the ad hoc key information message 420 that was sent by the node ID 137a.

In this connection, since the structure of data of the ad hoc network management information storage part 130 will differ according to the routing system, the structure is made to correspond to the routing system employed by the ad hoc network.

[Communication Processing of Ad Hoc Network]

Next, communication processing of the ad hoc network of this invention will be described using FIG. 9 to FIG. 13.

First, communication control processing in the communication terminal device 10 will be described using FIG. 9.

Figure 9:
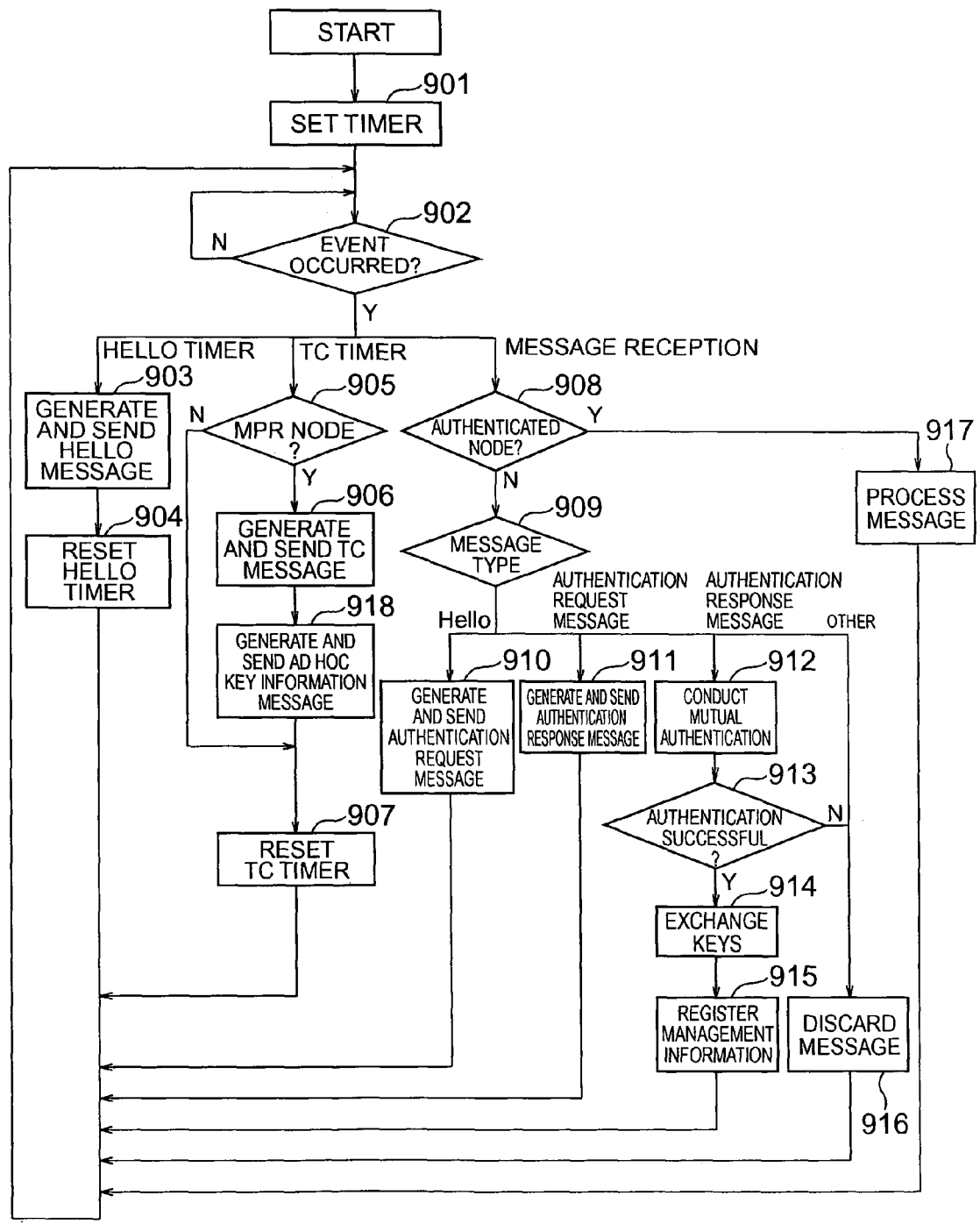
FIG. 9 is a flowchart showing communication control processing in the communication terminal device 10.

FIG. 9 is a flowchart showing communication control processing in the communication terminal device 10.

The communication terminal device 10 controls the sending of hello messages and Tc messages using a timer. More specifically, assuming that the sending interval for hello messages and Tc messages is, for example, 2 seconds and 5 seconds, respectively, a hello timer is set to 2 seconds and a Tc timer is set to 5 seconds and a timer up event occurs at those respective intervals (901).

The communication terminal device 10 then waits for the occurrence of an event (902). Examples of an event include, in addition to a timer up event, receipt of a message from another communication terminal device 10. When the communication terminal device 10 detects the occurrence of an event (902:Y), it performs processing that corresponds to the event.

More specifically, when the event that occurred is a timer up event of the hello timer, the communication terminal device 10 generates a hello message and delivers the message by broadcast (903). The hello message can be generated on the basis of information recorded in the ad hoc network management information storage part 130. The communication terminal device 10 then resets the hello timer (904) and waits for the occurrence of the next event (902).

When the event that occurred is a timer up event of the Tc timer, the communication terminal device 10 refers to the own node information 131 of the ad hoc network management information storage part 130 and determines whether or not the communication terminal device 10 itself is an MPR node (905). When the communication terminal device 10 determines that it is not an MPR node it resets the Tc timer (907) and waits for the occurrence of the next event (902). In contrast, when the communication terminal device 10 is itself an MPR node it generates a Tc message and delivers the message by broadcast (906). This Tc message can be created on the basis of information recorded in the ad hoc network management information storage part 130.

Next, the communication terminal device 10 generates the ad hoc key information message 420 and delivers the message by broadcast together with the above described Tc message (918).

The communication terminal device 10 then resets the Tc timer (907) and waits for the occurrence of the next event (902).

When the event that occurred is the receipt of a message from another communication terminal device 10, the communication terminal device 10 determines whether or not the other communication terminal device 10 is a communication terminal device 10 that completed authentication (908). The communication terminal device 10 can determine whether or not the other communication terminal device 10 completed authentication by referring to the direct node information 133 of the ad hoc network management information storage part 130.

When it determines as a result that the other communication terminal device 10 is not yet authenticated, the communication terminal device 10 determines the type of the received message (909). When the received message is a message other than a hello message, an authentication request message or an authentication response message, the communication terminal device 10 discards the received message (916).

When the received message is a hello message, the communication terminal device 10 creates an authentication request message and sends it to the node that generated the hello message (910). An authentication request message is a message requesting the other communication terminal device 10 to start authentication, and in order to have the node that generated the hello message determine the type of authentication, the communication terminal device 10 sends the identifier of an ad hoc key that it possesses. A detailed description of the authentication request message is described later.

When the received message is an authentication request message, the communication terminal device 10 generates an authentication response message and sends it to the node that is the source of the authentication request message (911). The authentication response message is a message for notifying the type of authentication. A detailed description of the authentication response message is described later.

When the received message is an authentication response message, the communication terminal device 10 conducts mutual authentication with the unauthenticated communication terminal device 10 in accordance with the value of an authentication type (described later) that is described in the authentication response message (912).

In order to simplify the authentication processing, when mutual authentication is being conducted for a communication terminal device 10 to participate in the ad hoc network for the first time the authentication is performed using a public key, and when mutual authentication is being conducted after a communication terminal device 10 moved within the ad hoc network or temporarily left the ad hoc network the authentication is performed using the ad hoc key as a common key. The procedures by which to conduct mutual authentication can be recorded in the policy storage part 150 as the authentication policy. The authentication policy can also record an interval time for conducting reauthentication, an authentication continuation count, an authentication level and the like.

A configuration may be adopted in which mutual authentication commences at a stage at which both of the communication terminal devices 10 verified the other party or at a stage where one of the communication terminal devices 10 verified the other party.

Authentication processing is implemented, as described in detail in ISO/IEC9798, by the exchange of messages a plurality of times. Hence, the mutual authentication (910) is in fact performed by the interchange of messages between the communication terminal devices 10 a plurality of times.

When it was not possible to authenticate the other communication party (913: N) as the result of mutual authentication, connection to the ad hoc network is not permitted on the basis that the other party is a communication terminal device 10 that is outside the group and the received hello message is discarded (916). It is thus possible to prevent a communication terminal device 10 that is outside the group from connecting to the ad hoc network.

When it was possible to authenticate the other communication party (913: Y) by mutual authentication, connection to the ad hoc network is permitted on the basis that the other party is a communication terminal device 10 that is included in the group, and the exchange of an inter-node key and an inner circle key is then performed by key exchange messages between the communication terminal devices 10 (described later), and the communication terminal devices 10 send and receive the ad hoc key information message 420 to each other to also exchange information relating to the ad hoc key (914). The required information is then registered in the ad hoc network management information storage part 130.

In this connection, although in the example illustrated in this flowchart authentication processing is not activated again once the mutual authentication was completed, authentication can be started autonomously at a timing that each terminal recognizes as necessary or at a regular timing.

When an event that occurred is receipt of a message from another communication terminal device 10 that was authenticated (908: Y), the communication terminal device 10 refers to the message type and performs processing that corresponds to that message (917).

More specifically, if the received message is a hello message, the communication terminal device 10 updates the ad hoc network management information storage part 130 as necessary. If the received message is a Tc message, the communication terminal device 10 updates the ad hoc network management information storage part 130 as necessary, and if the communication terminal device 10 is itself the MPR node, it also transfers the received Tc message to an adjacent node. When the communication terminal device 10 is itself the MPR node it also transfers the received ad hoc key information message 420 to the adjacent node.

For other messages that are not described in this specification, the communication terminal device 10 performs the appropriate processing that corresponds to the message type.

[Ad Hoc Key-Related Processing]

Figure 10:
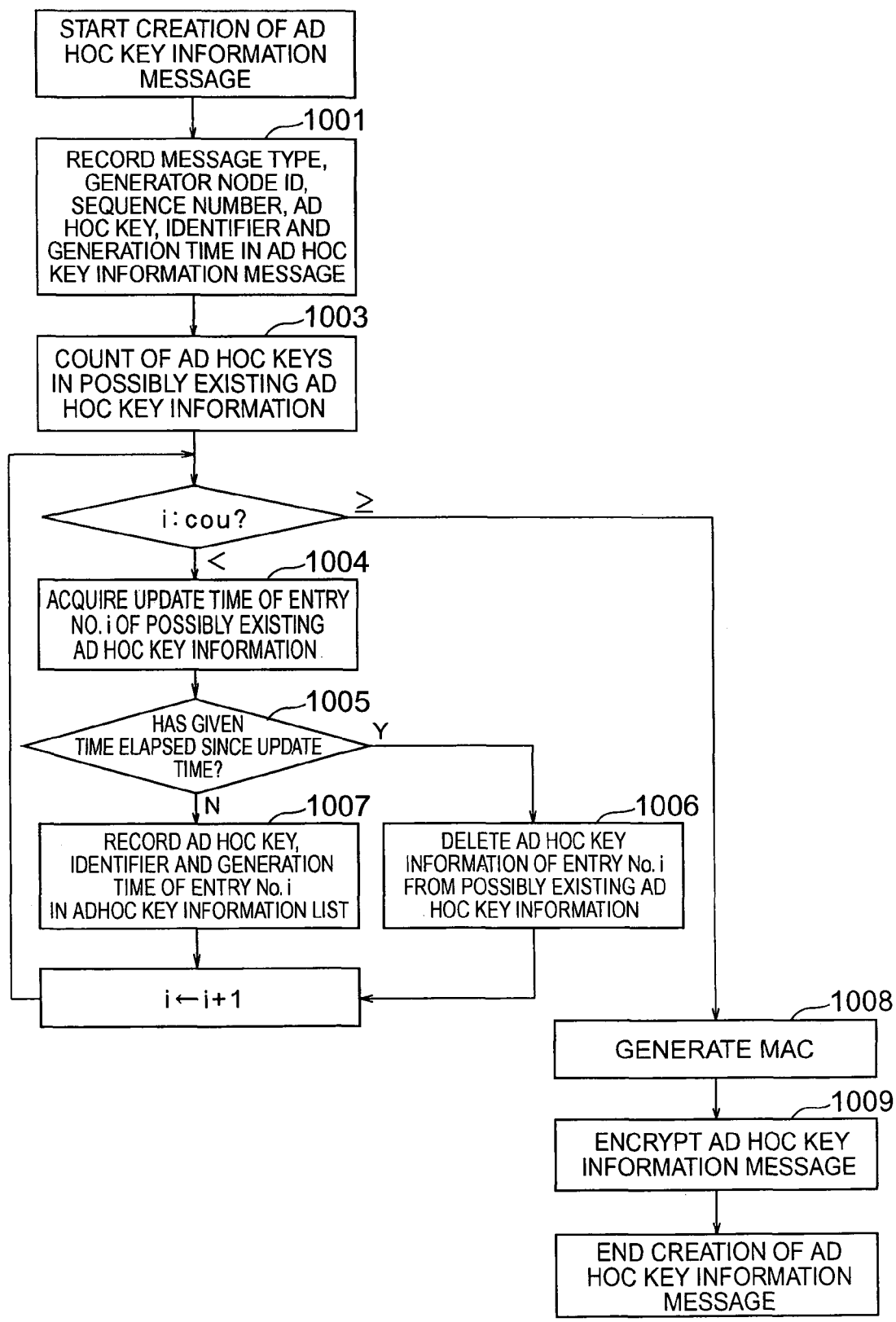
FIG. 10 is a flowchart showing processing that creates the ad hoc key information message 420.
Figure 11:
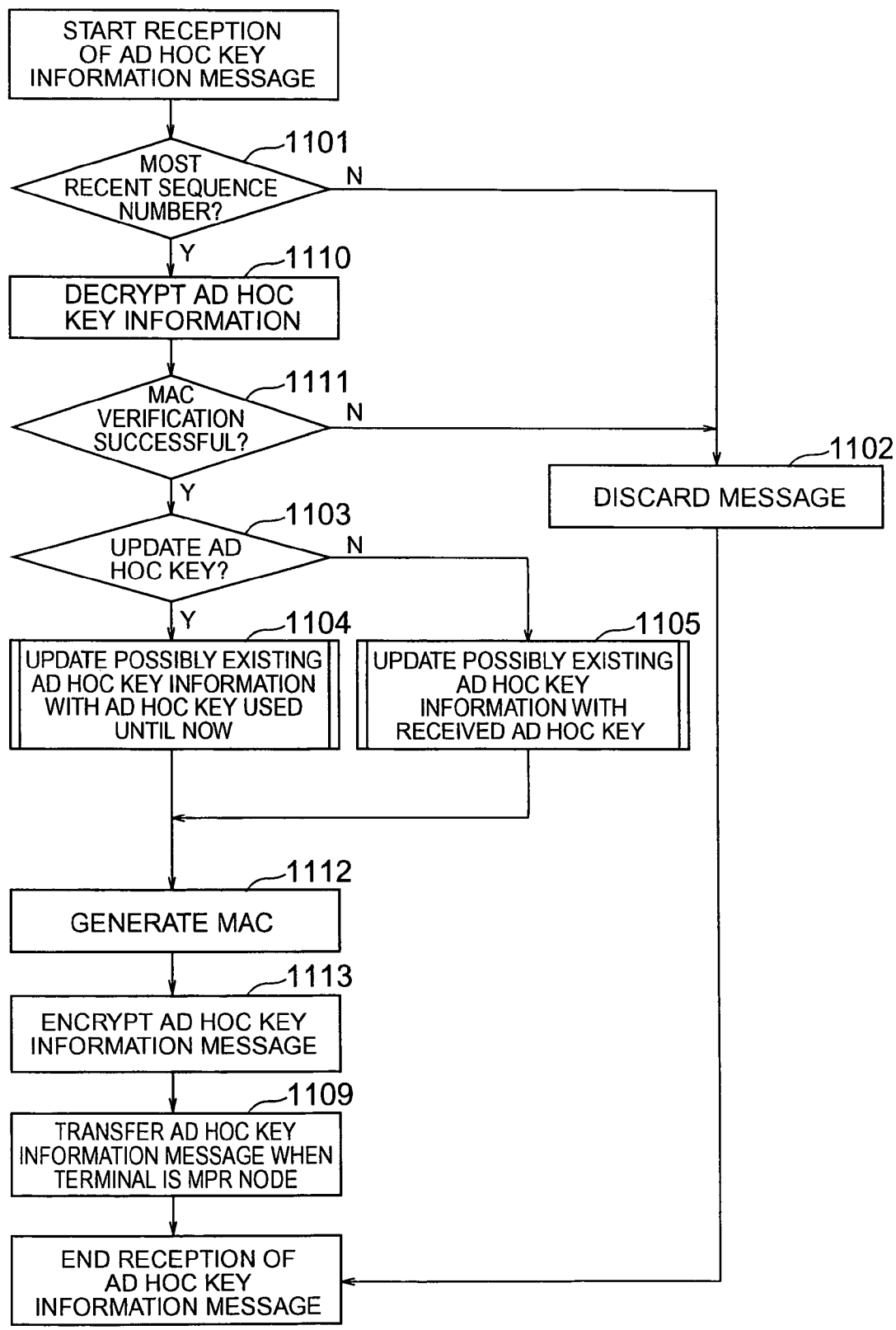
FIG. 11 is a flowchart showing processing in a case in which a received message is an ad hoc key information message.
Figure 12:
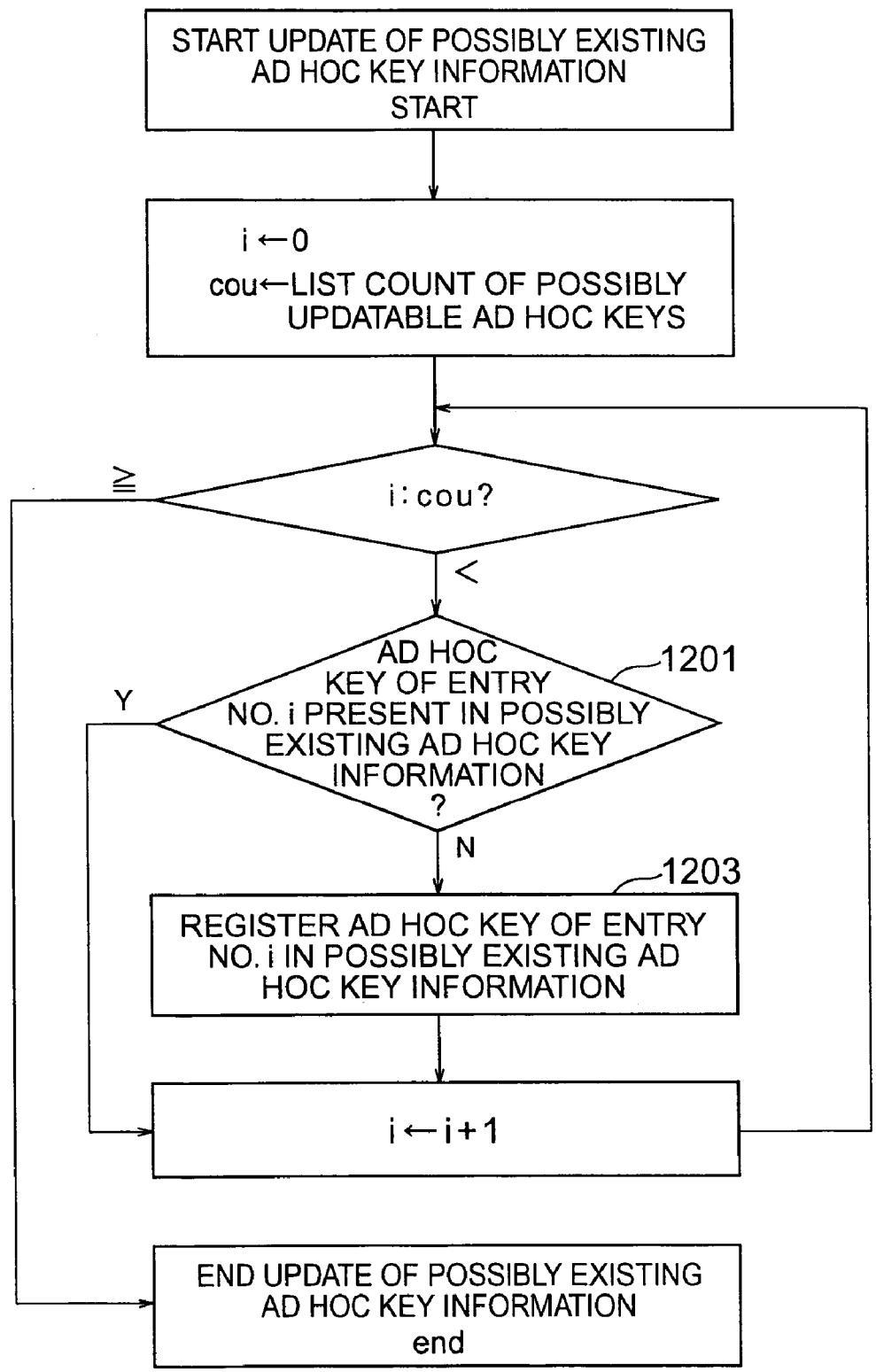
FIG. 12 is a flowchart showing processing that updates possibly existing ad hoc key information 136.

Next, processing relating to the ad hoc key is described using FIGS. 10 to 12.

First, processing that creates the ad hoc key information message 420 is described referring to the flowchart of FIG. 10.

FIG. 10 is a flowchart illustrating processing that creates the ad hoc key information message 420.

When creating the ad hoc key information message 420, as shown in FIG. 10, values other than the ad hoc key information list 427 and the MAC 428 are recorded in the ad hoc key information message 420 (1001). In the message type 421 of the ad hoc key information message 420 is recorded an identifier indicating that the message is an ad hoc key information message, in the generator node ID 422 is recorded the node ID 131a of the own node information 131, and in the sequence number 423 is recorded a serial number that distinguishes the ad hoc key information message. Further, in the ad hoc key 424, identifier 425 and generation time 426 of the ad hoc key information message 420 are respectively recorded the ad hoc key 135a, the identifier 135b and the generation time 135c of the ad hoc key information 135.

Next, ad hoc key information is acquired in order from the start of the possibly existing ad hoc key information 136 (1004), and the communication terminal device 10 checks the update time 136d to confirm that a given time period has not elapsed since this update time 136d (1005). When the given time period has elapsed, the communication terminal device 10 erases the information in question from the possibly existing ad hoc key information 135 (1006), and does not register the information in the ad hoc key information message. When the given time period has not elapsed, for that ad hoc key the communication terminal device 10 extracts the values from the ad hoc key 136a, the identifier 136b and the generation time 136c of the ad hoc key information 136 and registers these values respectively in ad hoc key, identifier and generation time (not shown) in the ad hoc key information list 427 of the ad hoc key information message 420 (1007).

After executing this processing for all the ad hoc keys of the possibly existing ad hoc key information 136, the communication terminal device 10 generates the MAC 428 (1008) and encrypts the ad hoc key information message using the circle key 131c of the own node information 131 (1009).

Next, processing in a case where the received message is an ad hoc key information message is described using the flowchart of FIG. 11.

FIG. 11 is a flowchart illustrating processing when a received message is an ad hoc key information message.

When the communication terminal device 10 receives the ad hoc key information message 420, it first refers to the sequence number information 137 and confirms, with respect to the generator node ID 422 of the received ad hoc key information message 420, whether or not the ad hoc key information message 420 is the most recent message (1101).

If the communication terminal device 10 determines as a result that the message is not the most recent message, it discards the message (1102).

When the message is the most recent message, the communication terminal device 10 decrypts the ad hoc key information message 420 with the inner circle key of the generator node ID 422 of the received ad hoc key information message 420 (1110) and verifies the MAC (1111). If the MAC verification failed, the communication terminal device 10 discards the message (1102), and if verification was successful the communication terminal device 10 compares the ad hoc key information 135 of its own node and the received ad hoc key 424 and selects the most recent ad hoc key.

The method for selecting the most recent ad hoc key, for example, may be stored in the policy storage part 150 as a key selection policy. The key selection policy, for example, may be a policy that selects the key with the most recent generation time. At such time, a policy can also be used that sets an idling time W and selects the key with the most recent generation time from among the ad hoc keys that were delivered at a time W prior to the timing of the ad hoc key selection. In this case, if W is "0", then the most recent key is selected.

When the ad hoc key was updated as the result of the ad hoc key selection, the communication terminal device 10 updates the possibly existing ad hoc key information 136 with the ad hoc key used until now (1104).

When the ad hoc key was not updated as the result of the ad hoc key selection, the communication terminal device 10 updates the possibly existing ad hoc key information 136 with the ad hoc key that was received (1105).

The communication terminal device 10 then creates a MAC with the inner circle key 131c of its own communication terminal device (1112). It then encrypts the ad hoc key information message (1113), and if the communication terminal device 10 is an MPR node it transfers the message to another communication terminal device 10 (1109).

Next, processing that updates the possibly existing ad hoc key information 136 is described referring to the flowchart of FIG. 12.

FIG. 12 is a flowchart illustrating processing that updates the possibly existing ad hoc key information 136.

First, the communication terminal device 10 sets the list count of possibly updatable ad hoc keys as a count number. When updating the possibly existing ad hoc key information 136 with the ad hoc key information list 427 of a received ad hoc key information message 420, that ad hoc key information list 427 is used.

The communication terminal device 10 then determines whether or not the ad hoc key of entry no. i is present in the possibly existing ad hoc key information 136 (1201). When the entry no. i ad hoc key is present that ad hoc key is skipped, and when the entry no. i ad hoc key is not present it is registered in the possibly existing ad hoc key information 136 (1203).

This process is repeated sequentially until the count number is reached.

[Mutual Authentication Processing of Communication Terminal Devices 10 of Ad Hoc Network]

Figure 13:
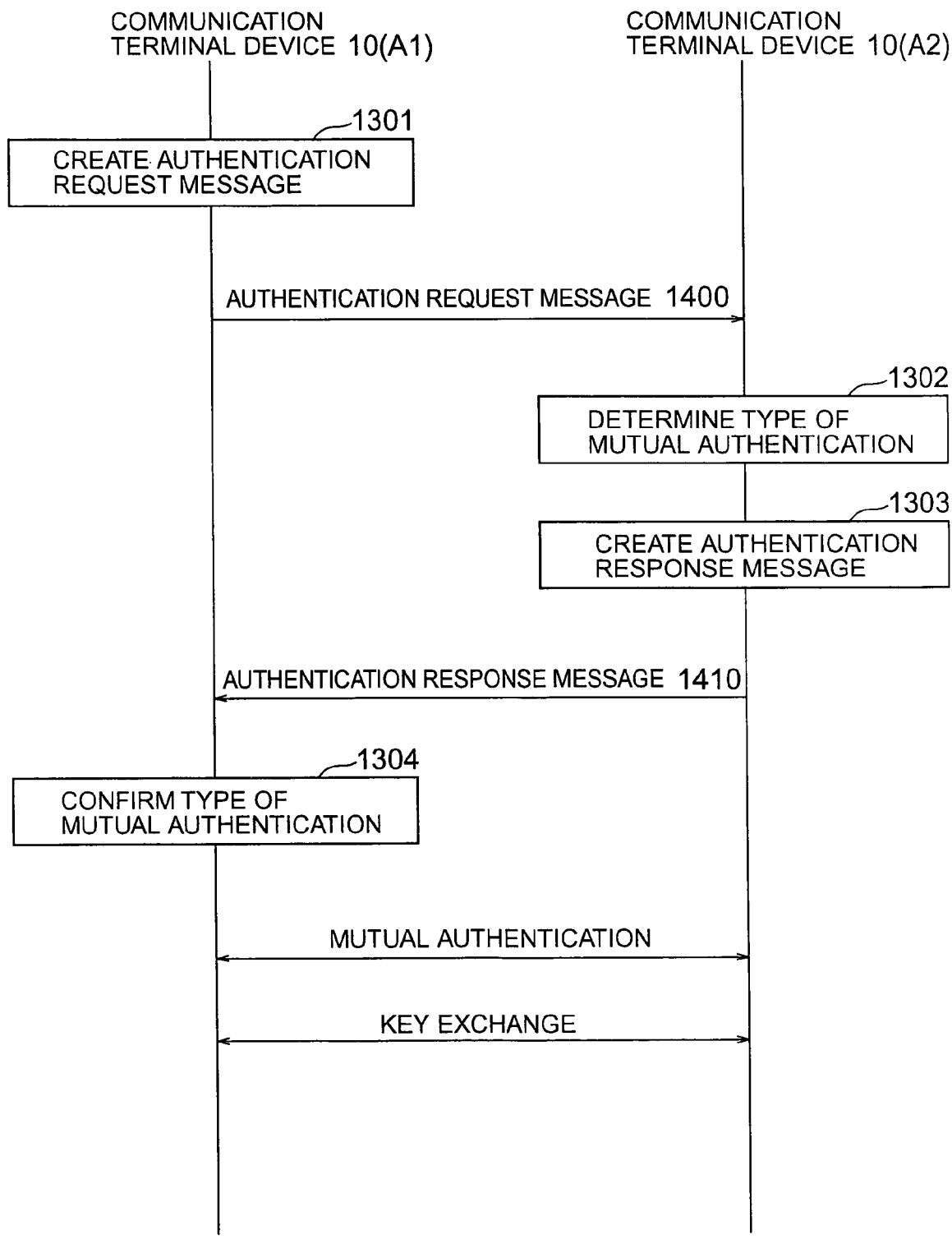
FIG. 13 is a sequence diagram showing the flow of mutual authentication between communication terminal devices 10 (A1, A2)

Next, mutual authentication processing of the communication terminal devices 10 of the ad hoc network of this invention is described using FIGS. 13 to 15.

FIG. 13 is a sequence diagram showing the flow of mutual authentication between communication terminal devices 10 (A1, A2).

FIG. 14 is a view showing one example of an authentication request message and an authentication response message.

FIG. 15 is a view showing one example of an authentication message and a key exchange message.

First, the flow of processing when communication terminal device 10 (A1) and communication terminal device 10 (A2) perform mutual authentication is described referring to FIG. 13.

When the communication terminal device 10 (A1) receives a hello message from the communication terminal device 10 (A2) that is an unauthenticated terminal, the communication terminal device 10 (A1) creates an authentication request message 1400 (1301) and sends it to the communication terminal device 10 (A2).

When the communication terminal device 10 (A2) receives the authentication request message 1400, it determines the type of mutual authentication (1302). In accordance with the result of determining the type of mutual authentication, the communication terminal device 10 (A2) creates an authentication response message 1410 (1303) and sends it to the communication terminal device 10 (A1).

Determination of the type of mutual authentication is conducted by determining whether or not the same identifier is present for the ad hoc key identifier of the ad hoc key identifier list 1404 of the authentication request message 1400 and the ad hoc key identifier of the possibly existing key information 136 and the ad hoc key information 135 of the own communication terminal device 10. When the same ad hoc key identifier is present, authentication is performed using the ad hoc key, and when it is not present authentication is performed using a public key.

Authentication using a public key is, for example, performed as follows.

One of the communication terminal devices 10 (authentication subject) sends data that was created using a random number to the other communication terminal device 10 (authentication object). The communication terminal device 10 that received that data encrypts the data and returns it to the communication terminal device 10 that is the data source. The communication terminal device 10 that is the data source decrypts the data using the public key, and when the decrypted data matches the original data, it recognizes that the communication terminal device 10 that sent the encrypted data is an authentic communication party. In this connection, when sending the public key it is necessary for the communication terminal device 10 that is the object of authentication to also send certificate data showing that the public key is authentic to the communication terminal device 10 that is the authentication subject.

The procedures for authentication using an ad hoc key differ from the procedures for authentication using a public key only in that encryption and decryption are both performed with a common ad hoc key.

The communication terminal device 10 (A1) that received the authentication response message 1410 confirms the type of mutual authentication (1404), and starts mutual authentication in accordance with the type of authentication. When mutual authentication is successful, key exchange is conducted.

In the key exchange process, the terminals exchange the key exchange message 1510 that is described later to enable the necessary keys to be shared by both parties.

If necessary at the time of this key exchange, an ad hoc key is generated and the ad hoc key information message 420 is sent and received by both parties to also share the ad hoc key.

More specifically, in order to reduce as much as possible the number of ad hoc keys that exist on the ad hoc network, the communication terminal device 10 (A1) and communication terminal device 10 (A2) that successfully completed mutual authentication confirm between themselves whether or not one or the other possesses an ad hoc key. Only in a case where neither of the communication terminal devices (A1 and A2) possesses an ad hoc key does one of the communication terminal devices generate an ad hoc key and an ad hoc key identifier. The communication terminal device in question then records the generated ad hoc key, ad hoc key identifier and the ad hoc key generation time in the ad hoc key information 135 of the ad hoc network management information storage part 130, and creates the ad hoc key information message 420 and sends it to the other communication terminal device with a key exchange message.

When one of the communication terminal devices possesses an ad hoc key, the communication terminal device that possesses the ad hoc key creates the ad hoc key information message 420 for the other communication terminal device and sends it together with a key exchange message.

When both of the communication terminal devices (A1 and A2) possess an ad hoc key, both of the communication terminal devices (A1 and A2) create the ad hoc key information message 420 and send it to the other communication terminal device with a key exchange message.

By performing authentication using an ad hoc key according to the method described above it is possible to simplify processing in a case where a communication terminal device 10 moves and the connection relationship changes or when a communication terminal device 10 reconnects to the network after the original connection was temporarily broken.

Figure 14A:
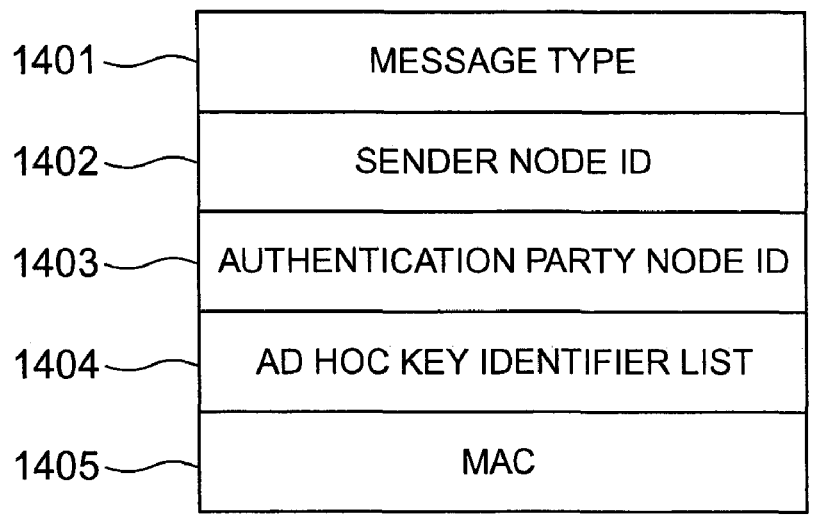
FIGS. 14A and 14B are views showing one example of an authentication request message and an authentication response message.

The authentication request message 1400 is, as described above, a message with which one communication terminal device 10 requests another communication terminal device 10 for authentication. As shown in FIG. 14A, the authentication request message 1400 consists of a message type 1401, a sender node ID 1402, an authentication party node ID 1403, an ad hoc key identifier list 1404 and a MAC 1405.

The message type 1401 is an identifier showing that this message is an authentication request message. The sender node ID 1402 is an identifier showing the node ID of the own communication terminal device 10. The authentication party node ID 1403 is an identifier showing the node ID of the communication terminal device 10 that is the authentication party. The ad hoc key identifier list 1404 is a list of identifiers of ad hoc keys managed by the own node, that is, a list of identifiers of ad hoc keys that are present in the ad hoc key information 135 and the possibly existing ad hoc key information 136. The MAC 1405 is a code that ensures the integrity of the authentication request message.

Figure 14B:
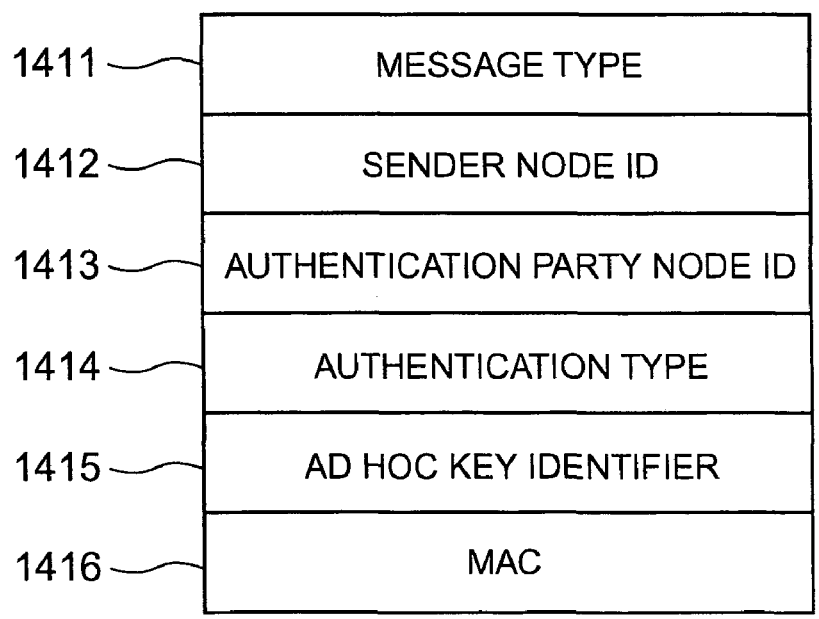

The authentication response message 1410 is, as described above, a message in response to the authentication request message 1400. As shown in FIG. 14B, the authentication response message 1410 consists of a message type 1411, a sender node ID 1412, an authentication party node ID 1413, an authentication type 1414, an ad hoc key identifier 1415 and a MAC 1416.

The message type 1411 is an identifier showing that this message is an authentication response message. The sender node ID 1412 is an identifier showing the node ID the own communication terminal device 10. The authentication party node ID 1413 is an identifier showing the node ID of the communication terminal device that sent an authentication commencement message. The authentication type 1414 is a flag indicating whether to perform authentication by public key or to perform authentication by ad hoc key. In this connection, when the identifier of the ad hoc key identifier list 1404 of the received authentication request message 1400 is present in the ad hoc key information 135 and the possibly existing ad hoc key information 136 of the ad hoc network management information storage part 130 in the own communication terminal device 10 the authentication type 1414 is mutual authentication by ad hoc key, and when the identifier is not present therein the mutual authentication is by public key. The ad hoc key identifier 1415 is the identifier of an ad hoc key used for mutual authentication when the authentication type 1414 is authentication by ad hoc key. In this connection, when the authentication type 1414 is authentication by public key, nothing is recorded for the ad hoc key identifier 1415 (null value). The MAC 1416 is a code that ensures the integrity of the authentication response message.

Figure 15A:
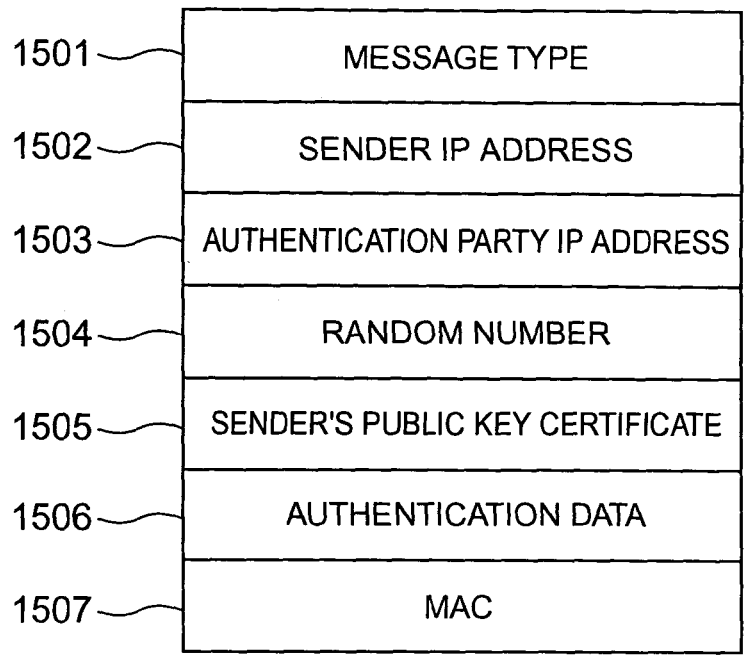
FIGS. 15A and 15B are views showing an example of an authentication message and a key exchange message.

An authentication message 1500 is a message exchanged between two of the communication terminal devices 10 at the time of mutual authentication, and as shown in FIG. 15A the message consists of a message type 1501, a sender IP address 1502, an authentication party IP address 1503, a random number 1504, a sender's public key certificate 1505, an authentication data 1506 and a MAC 1507.

The message type 1501 is an identifier showing that this message is an authentication message. The sender IP address 1502 is an address for identifying the communication terminal device 10 that is the source of the authentication message. The authentication party IP address 1503 is an address for identifying the communication terminal device 10 that is the authentication party. The random number 1504 is random number data that was generated by the communication terminal device 10 that is the message source, and the authentication data 1506 described hereunder is created by the authentication party encrypting this random number data. The sender's public key certificate 1505 is a digital certificate for certifying the correctness of the public key, and the public key is also included therein. Here, the reason for sending the public key is to pass an authentic public key to the party that is attempting to authenticate the communication terminal device 10 in question, to have the other party make the communication terminal device 10 in question decrypt encrypted data.

The authentication data 1506 is data that the communication terminal device 10 that is the message source encrypted with secret key information for the random number generated by the authentication party. The MAC 1507 is a code that ensures the integrity of the message contents.

Figure 15B:
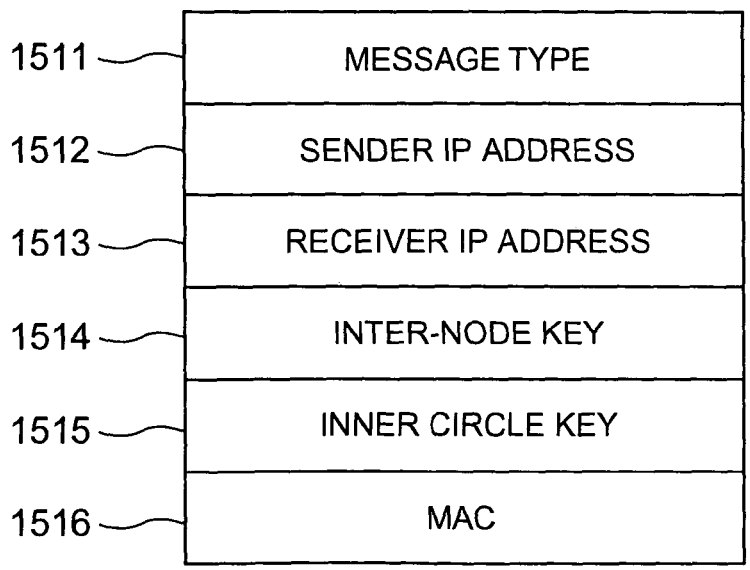

The key exchange message is a message exchanged by the communication terminal devices after mutual authentication in order to share each other's key. As shown in FIG. 15B, the key exchange message consists of a message type 1511, a sender IP address 1512, a receiver IP address 1513, an inter-node key 1514, an inner circle key 1515 and a MAC 1516.

The message type 1511 is an identifier showing that this message is a key exchange message. The sender IP address 1512 is an address for identifying the communication terminal device 10 that is the source of the key exchange message. The receiver IP address 1513 is an address for identifying the communication terminal device 10 that is the destination of the key exchange message. The inter-node key 1514 represents an inter-node key that is shared in node units between the communication terminal devices 10. The inner circle key 1515 represents a circle key that is shared in circle units between the communication terminal devices 10. The MAC 1516 is a code that ensures the integrity of the message contents.

Of these, the inter-node key 1514, the inner circle key 1515 and the MAC 1517 are, for example, encrypted using the public key of the communication terminal device 10 on the receiving side.

[Relationship Between Topology of Specific Ad Hoc Network and Authentication Processing]

Next, the relationship between the topology of a specific ad hoc network and mutual authentication processing of the communication terminal devices 10 is described using FIGS. 16 to 21.

Figure 16:
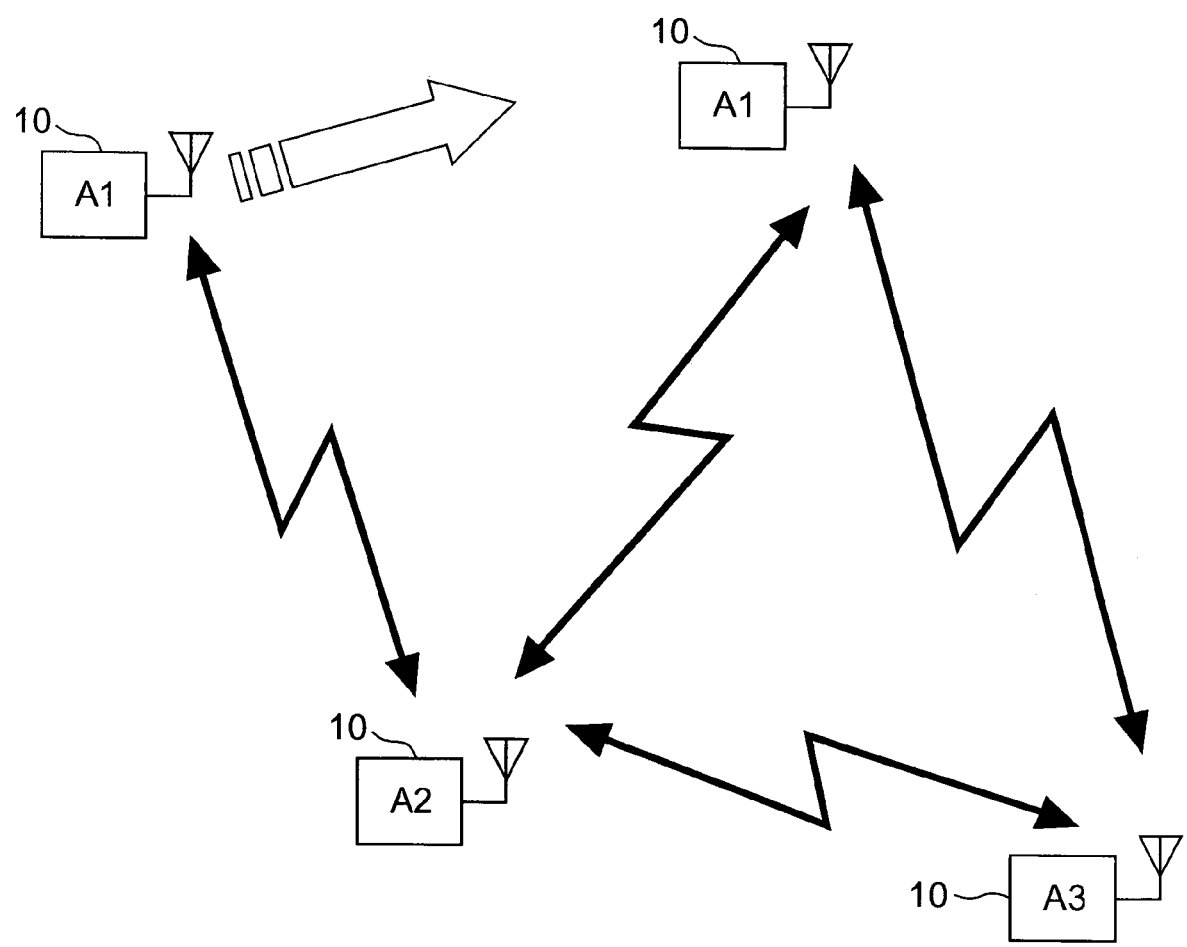
FIG. 16 is a view showing an example of a topological change in an ad hoc network (part one)
Figure 17:
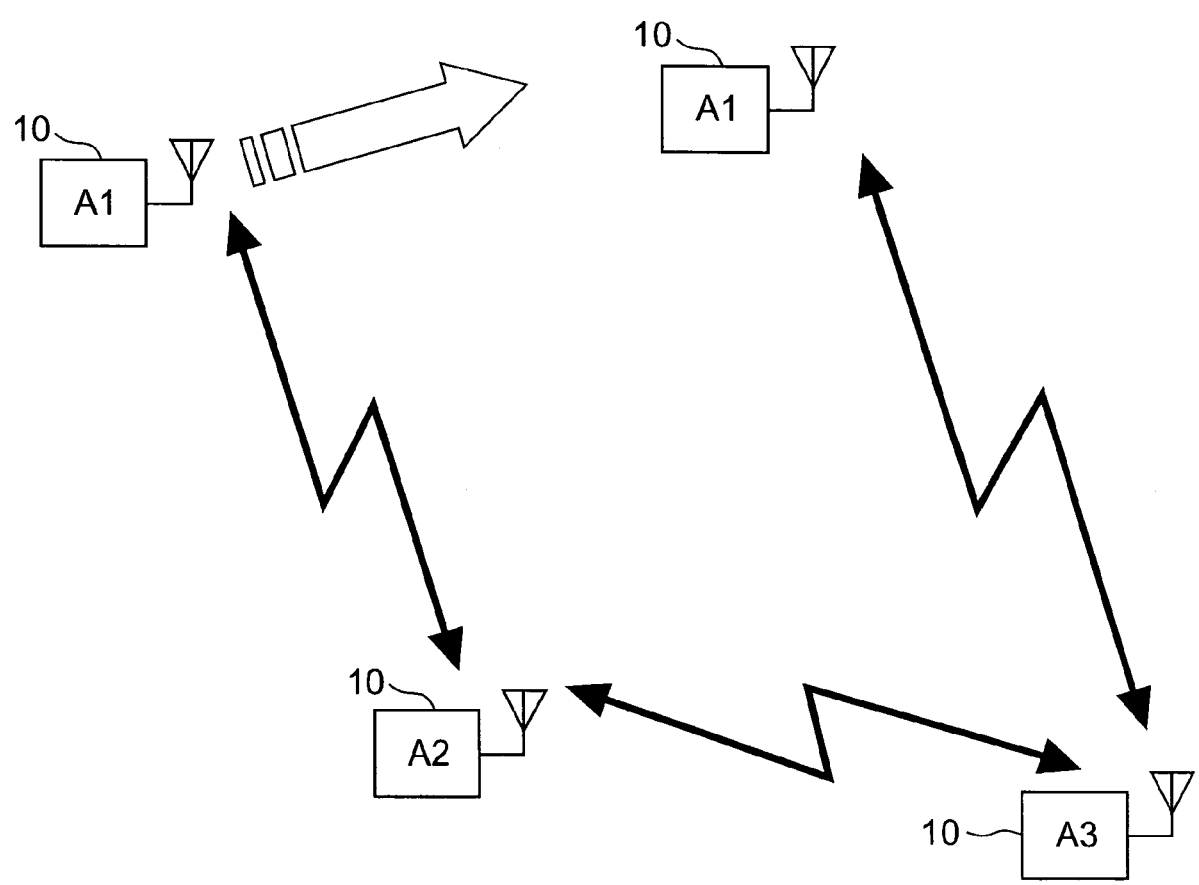
FIG. 17 is a view showing an example of a topological change in an ad hoc network (part two)
Figure 18:
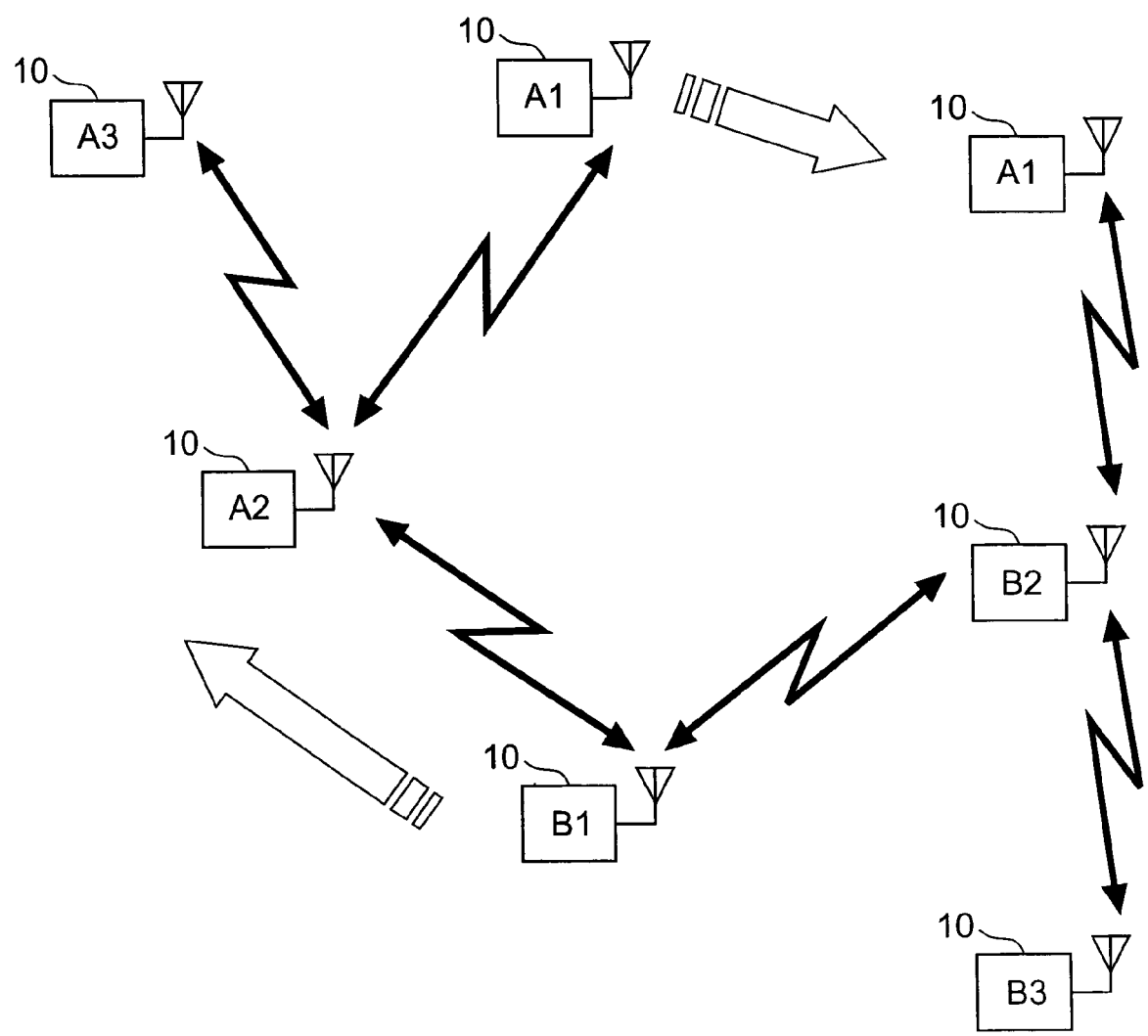
FIG. 18 is a view showing an example of a topological change in an ad hoc network (part three)

FIG. 16 to FIG. 18 are views showing examples of topological changes in an ad hoc network.

Figure 19:
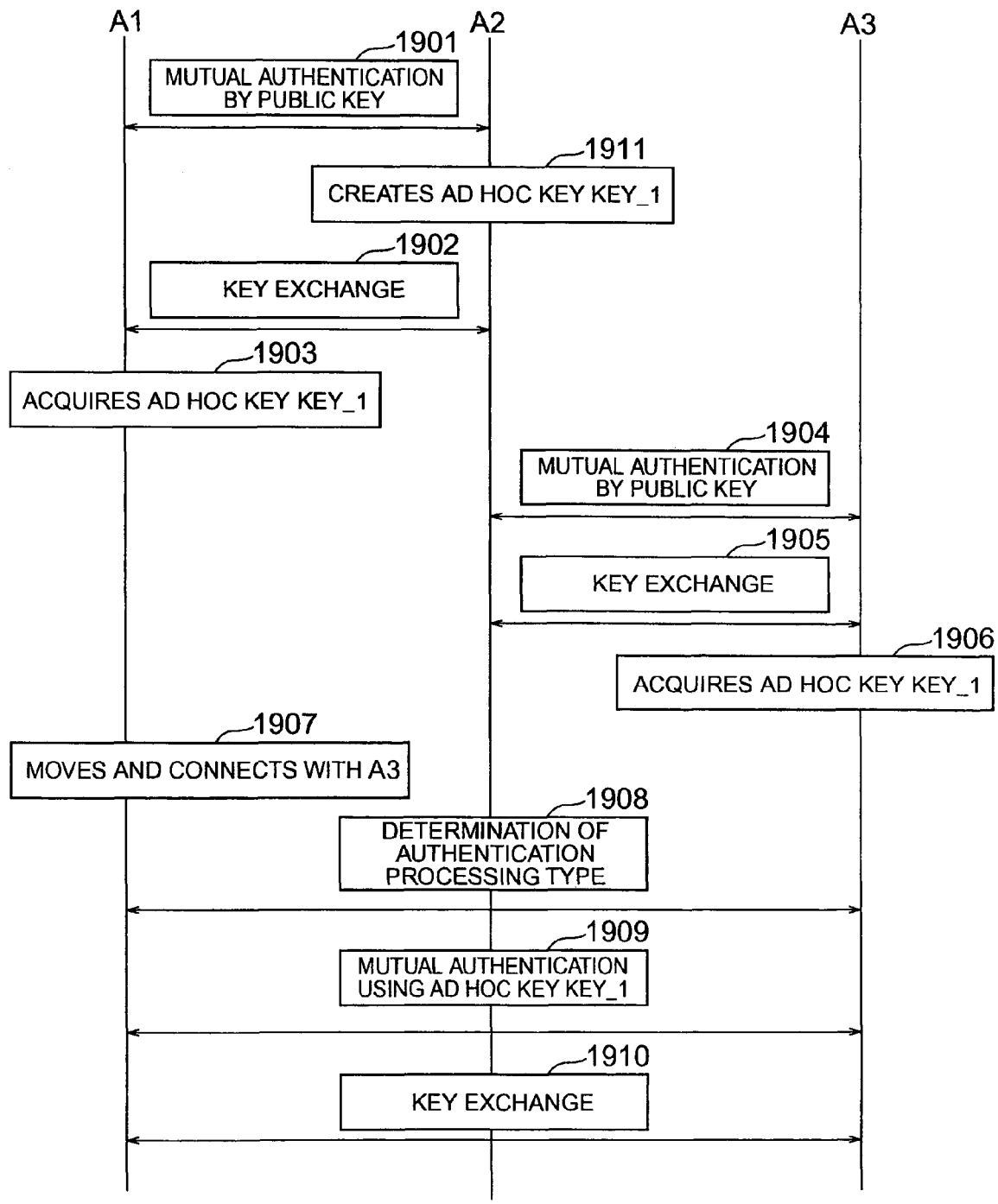
FIG. 19 is a sequence diagram illustrating the processing of each communication terminal device at the time of the topological change shown in FIG. 16.

FIG. 19 is a sequence diagram illustrating the flow of processing of each communication terminal device at the time of the topological change shown in FIG. 16.

Figure 20:
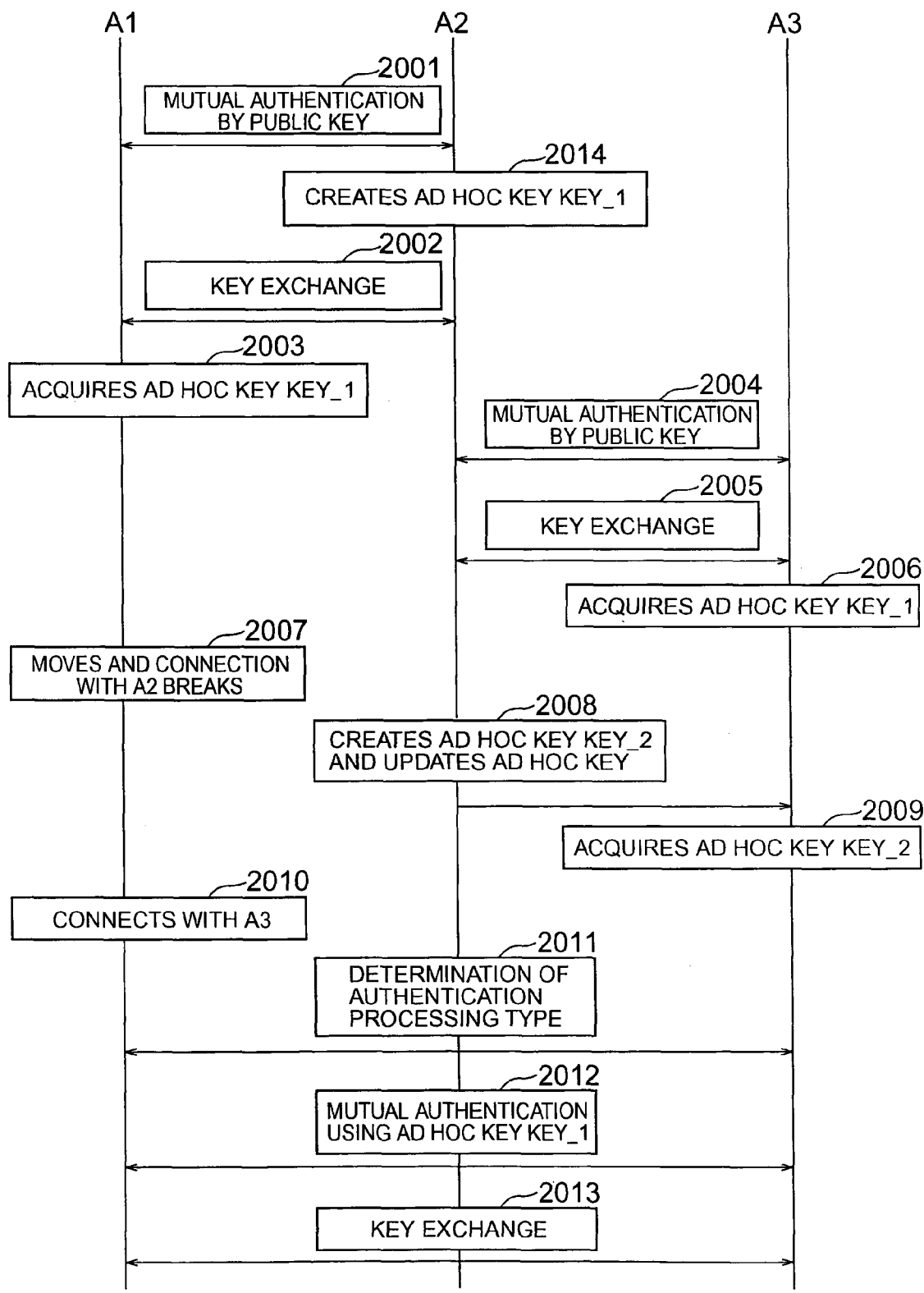
FIG. 20 is a sequence diagram illustrating the processing of each communication terminal device at the time of the topological change shown in FIG. 17.

FIG. 20 is a sequence diagram illustrating the flow of processing of each communication terminal device at the time of the topological change shown in FIG. 17.

Figure 21:
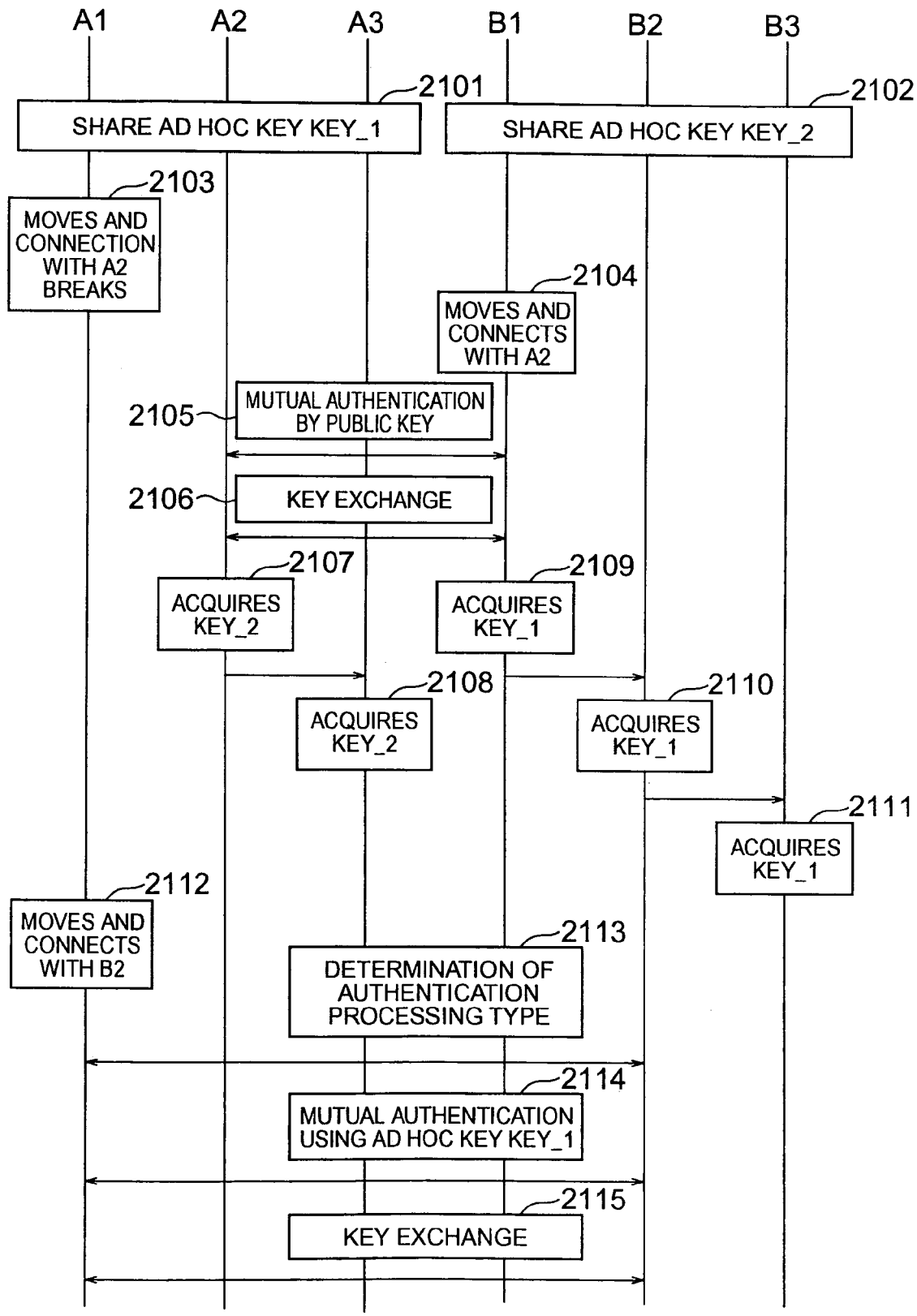
FIG. 21 is a sequence diagram illustrating the processing of each communication terminal device at the time of the topological change shown in FIG. 18.

FIG. 21 is a sequence diagram illustrating the flow of processing of each communication terminal device at the time of the topological change shown in FIG. 18.

As the first example, a case is considered in which, as shown in FIG. 16, the communication terminal device 10 (A1) moved to create a new connection relationship.

The ad hoc network shown in FIG. 16 is composed by communication terminal devices 10 (A1, A2 and A3). Initially, a connection relationship exists between the communication terminal device 10 (A1) and the communication terminal device 10 (A2), and the communication terminal device 10 (A2) and the communication terminal device 10 (A3).

First, mutual authentication using a public key commences between the communication terminal device 10 (A1) and the communication terminal device 10 (A2) (1901). At this time, since neither of the communication terminal devices 10 (A1 and A2) possess an ad hoc key, one of the communication terminal devices 10 (A1 and A2) generates an ad hoc key and delivers it to the other party. Here, it is assumed that the communication terminal device 10 (A2) generates an ad hoc key $Key_{\_1}$ (1911) and sends the ad hoc key information message 420 to the communication terminal device 10 (A1) when performing key exchange of an inner circle key or the like (1902, 1903).

Next, mutual authentication using a public key starts between the communication terminal device 10 (A2) and the communication terminal device 10 (A3) (1904). At this time, since the communication terminal device 10 (A2) already possesses the ad hoc key Key_1, when performing key exchange of an inner circle key or the like the communication terminal device 10 (A2) sends the ad hoc key information message 420 to the communication terminal device 10 (A3) to deliver the ad hoc key Key_1 (1905, 1906).

Thereafter, the communication terminal device 10 (A1) moves and enters a new connection relationship with the communication terminal device 10 (A3) (1907). When the communication terminal device 10 (A3) receives a hello message from the communication terminal device 10 (A1), the communication terminal device 10 (A3) sends the communication terminal device 10 (A1) an authentication request message in which the identifier of the ad hoc key Key_1 is recorded. The communication terminal device 10 (A1) compares the identifier of the ad hoc key of the received authentication request message and the identifier of the ad hoc key possessed by its own node, and confirms that it possesses the same ad hoc key Key_1. Thus, mutual authentication that does not create a load commences using the ad hoc key Key_1 between the communication terminal device 10 (A3) and the communication terminal device 10(A1) that requested authentication using the ad hoc key Key_1 with an authentication response message and entered a new connection relationship (1909).

Next, as a second example, a case is considered in which, as shown in FIG. 17, the communication terminal device 10 (A1) temporarily left the ad hoc network.

The ad hoc network shown in FIG. 17 is composed by communication terminal devices 10 (A1, A2 and A3). Initially, a connection relationship exists between the communication terminal device 10 (A1) and the communication terminal device 10 (A2), and the communication terminal device 10 (A2) and the communication terminal device 10 (A3).

First, mutual authentication using a public key commences between the communication terminal device 10 (A1) and the communication terminal device 10 (A2) (2001). At this time, since neither of the communication terminal devices 10 (A1 and A2) possesses an ad hoc key, one of the communication terminal devices 10 (A1 and A2) generates an ad hoc key and delivers it to the other party. Here, it is assumed that the communication terminal device 10 (A2) generates ad hoc key $Key_{\_1}$ (2014) and sends the ad hoc key information message 420 to the communication terminal device 10 (A1) when performing key exchange of a circle key or the like (2002, 2003).

Next, mutual authentication using a public key starts between the communication terminal device 10 (A2) and the communication terminal device 10 (A3) (2004). At this time, since the communication terminal device 10 (A2) already possesses the ad hoc key Key_1, the communication terminal device 10 (A2) sends the ad hoc key information message 420 to the communication terminal device 10 (A3) to distribute the ad hoc key Key_1 when performing key exchange of the circle key or the like (2005, 2006).

Subsequently, the communication terminal device 10 (A1) moves and the connection with the communication terminal device 10 (A2) is broken (2007). It is assumed that the ad hoc key is then updated (2008), and the ad hoc key between the communication terminal devices 10 (A2, A3) is a $Key_{\_2}$ (2009). Thereafter, the communication terminal device 10 (A1) enters a connection relationship with the communication terminal device 10 (A3) (2010). At this time, when the communication terminal device 10 (A3) receives a hello message from the communication terminal device 10 (A1), the communication terminal device 10 (A3) records in an authentication request message the ad hoc key Key_2 of its own node and the ad hoc key Key_1 that is recorded in the ad hoc key information, and sends the message to the communication terminal device 10 (A1). The communication terminal device 10 (A1) compares the list of ad hoc key identifiers of the received authentication request message with the identifier of the ad hoc key Key_1 that is possessed by its own node and confirms that the same identifier is present in the list. The communication terminal device 10 (A1) then creates an authentication response message using the ad hoc key Key_1 to start mutual authentication that does not create a load between the communication terminal device 10 (A1) and the communication terminal device 10 (A3) using the ad hoc key Key_1.

Next, as a third example, a case is considered in which, as shown in FIG. 18, a communication terminal device temporarily departs from the ad hoc network and a new connection relationship then forms.

In the example illustrated in FIG. 18, an ad hoc network group 1 consisting of the communication terminal devices 10 (A1, A2, A3) and an ad hoc network group 2 consisting of the communication terminal devices 10 (B1, B2, B3) exist.

In group 1, initially the communication terminal device 10 (A1) and the communication terminal device 10 (A2), and the communication terminal device 10 (A2) and the communication terminal device 10 (A3) are in a connection relationship, and they share an ad hoc key Key_1 (2101).

In group 2, the communication terminal device 10 (B1) and the communication terminal device 10 (B2), and the communication terminal device 10 (B2) and the communication terminal device 10 (B3) are in a connection relationship, and they share an ad hoc key Key_2 (2102).

Subsequently, the communication terminal device 10 (A1) leaves group 1 (2103), and immediately thereafter group 1 and group 2 approach each other (2104) and the communication terminal device 10 (A2) and the communication terminal device 10 (B1) enter a connection relationship. It is assumed that the communication terminal device 10 (A1) thereafter enters a connection relationship with the communication terminal device 10 (B2).

When the communication terminal device 10 (A2) and the communication terminal device 10 (B1) enter a connection relationship (2104), mutual authentication starts (2105) and exchange of a circle key or ad hoc key or the like is conducted (2105).

The communication terminal device 10 (A2) that acquired the ad hoc key Key_2 transfers the ad hoc key Key_2 to the communication terminal device 10 (A3) to which it can send data directly without sending the data by way of another communication terminal device from its own communication terminal device (2110).

The communication terminal device 10 (B1) that acquired the ad hoc key Key_1 transfers the ad hoc key Key_1 to the communication terminal device 10 (B2) to which it can send data directly without sending the data by way of another communication terminal device from its own communication terminal device (2110).

Likewise, the communication terminal device 10 (B2) transfers the data to the communication terminal device 10 (B3) (2111).

As a result, the communication terminal devices 10 (A2, A3, B1, B2, B3) possess the same information for ad hoc keys Key_1 and Key_2.

In this case, when the communication terminal device 10 (A1) enters a connection relationship with the communication terminal device 10 (B2) (2112) and the communication terminal device 10 (B2) receives a hello message from the communication terminal device 10 (A1), the communication terminal device 10 (B2) records in an authentication request message the ad hoc key Key_2 of its own node and the ad hoc key Key_1 that is recorded in the ad hoc key information and sends the message to the communication terminal device 10 (A1). The communication terminal device 10 (A1) compares the list of ad hoc key identifiers of the received authentication request message with the identifier of the ad hoc key Key_1 that is possessed by its own node and confirms that the same identifier is present in the list. The communication terminal device 10 (A1) then creates an authentication response message using the ad hoc key Key_1 to start mutual authentication that does not create a load between the communication terminal device 10 (A1) and the communication terminal device 10 (B2) using the ad hoc key Key_1 (2114).

The invention claimed is:

1. An authentication method of an ad hoc network that is configured by wireless communication terminals communicating with each other,
   wherein, when a first wireless communication terminal and a second wireless communication terminal conduct mutual authentication, the authentication method comprises:
   determining whether or not a common key that is commonly possessed by the first wireless communication terminal and the second wireless communication terminal exists;
   conducting, when a common key that is commonly possessed does not exist, a first mutual authentication using a public key, and effecting commonly possessing a common key by the first wireless communication terminal and the second wireless communication terminal, when both of the terminals having successfully completed the first mutual authentication; and
   conducting when a common key that is commonly possessed exists, a second mutual authentication between the first and the second wireless communication terminals with the common key;
   wherein, in the effecting commonly possessing the common key:
   when a common key does not exist in either the first wireless communication terminal or the second wireless communication terminal, the first wireless communication terminal generates a common key, and sends common key information including the common key to the second wireless communication terminal,
   when a common key exists in the first wireless communication terminal and a common key does not exist in the second wireless communication terminal, the first wireless communication terminal sends common key information including the common key to the second wireless communication terminal, and
   when a common key exists in the first wireless communication terminal and another common key also exists in the second wireless communication terminal, the first wireless communication terminal sends common key information including the common key that the first wireless communication terminal possesses to the second wireless communication terminal and the second wireless communication terminal sends common key information including the common key that the second wireless communication terminal possesses to the first wireless communication terminal.

2. The authentication method of an ad hoc network according to claim 1, wherein the common key information includes a common key generated by the own terminal and a common key included in common key information received from another terminal.

3. The authentication method of an ad hoc network according to claim 1, wherein a wireless communication terminal transmits common key information that the wireless communication terminal possesses to another adjacent wireless communication terminal.

4. A wireless communication terminal of an ad hoc network that is configured by wireless communication terminals communicating with each other, wherein the wireless communication terminal has:
   means that performs a first mutual authentication between wireless communication terminals;
   means that performs a second mutual authentication between wireless communication terminals using a common key;
   means that sends a common key information message relating to a common key for mutual authentication;
   means that receives a common key information message relating to a common key for mutual authentication;
   means that stores a common key for mutual authentication; and
   means that determines, when performing mutual authentication with another wireless communication terminal on the ad hoc network, whether or not a common key that is commonly possessed by the other wireless communication terminal exists;
   wherein, when the means that determines whether or not a common key that is commonly possessed by the other wireless communication terminal exists determines that a commonly possessed common key does not exist, a first mutual authentication using a public key is conducted with the other wireless communication terminal by means that conducts the first mutual authentication between the wireless communication terminals, and effecting the wireless communication terminal that successfully completed the first mutual authentication and the other wireless communication terminal to possess a common key, and when the means that determines whether or not a common key that is commonly possessed by the other wireless communication terminal exists determines that a commonly possessed common key exists, a second mutual authentication is conducted by means that uses the common key to conduct the second mutual authentication between the wireless communication terminal and the other wireless communication terminal using the common key;

wherein, in the effecting commonly possessing the common key:

when a common key does not exist in either the wireless communication terminal or the other wireless communication terminal, the wireless communication terminal generates a common key, and sends common key information including the common key to the other wireless communication terminal, when a common key exists in the wireless communication terminal and a common key does not exist in the other wireless communication terminal, the wireless communication terminal sends common key information including the common key to the other wireless communication terminal, and when a common key exists in the wireless communication terminal and another common key also exists in the other wireless communication terminal, the wireless communication terminal sends common key information including the common key that the wireless communication terminal possesses to the other wireless communication terminal and the other wireless communication terminal sends common key information including the common key that the other wireless communication terminal possesses to the wireless communication terminal.

5. The wireless communication terminal of an ad hoc network according to claim 4, wherein the common key information message includes a common key generated by the own terminal and a common key received from another terminal as a common key information list.

6. The wireless communication terminal of an ad hoc network according to claim 4, wherein the wireless communication terminal and another wireless communication terminal send and receive the common key information message to and from each other.

7. The wireless communication terminal of an ad hoc network according to claim 4, wherein the wireless communication terminal broadcasts the common key information message to other adjacent wireless communication terminals.

8. The wireless communication terminal of an ad hoc network according to claim 4, wherein the wireless communication terminal stores a common key generated by its own terminal and a common key received from another terminal as information on common keys that exist.

9. An authentication method of an ad hoc network that is configured by wireless communication terminals communicating with each other, wherein, when a first wireless communication terminal and a second wireless communication terminal conduct mutual authentication, the authentication method comprises:

determining whether or not a common ad hoc network key for authentication to an ad hoc network is commonly possessed by the first wireless communication terminal and the second wireless communication terminal;

conducting, when the common ad hoc network key is not commonly possessed, a first mutual authentication using a public key, and if the first and the second wireless communication terminals belong to a predetermined ad hoc network group, effecting commonly possessing the common ad hoc network key by the first wireless communication terminal and the second wireless communication terminal, when both of the terminals having successfully completed the first mutual authentication; and conducting when the common ad hoc network key is commonly possessed, a second mutual authentication between the first and the second wireless communication terminals with the common ad hoc network key to establish the first and the second wireless communication terminals as authenticated within the ad hoc network;

wherein, in the effecting commonly possessing the common key:

when a common key does not exist in either the first wireless communication terminal or the second wireless communication terminal, the first wireless communication terminal generates a common key, and sends common key information including the common key to the second wireless communication terminal, when a common key exists in the first wireless communication terminal and a common key does not exist in the second wireless communication terminal, the first wireless communication terminal sends common key information including the common key to the second wireless communication terminal, and when a common key exists in the first wireless communication terminal and another common key also exists in the second wireless communication terminal, the first wireless communication terminal sends common key information including the common key that the first wireless communication terminal possesses to the second wireless communication terminal and the second wireless communication terminal sends common key information including the common key that the second wireless communication terminal possesses to the first wireless communication terminal.

* * * * *